(12) United States Patent
Jaskiewicz et al.

(10) Patent No.: US 10,270,874 B2
(45) Date of Patent: *Apr. 23, 2019

(54) SYSTEM AND METHOD FOR SELECTIVE ACTIVATION OF SITE FEATURES

(71) Applicant: Open Text SA ULC, Halifax (CA)

(72) Inventors: Michael Gerard Jaskiewicz, Urbandale, IA (US); Bertrand Guy Le Bescond de Coatpont, Austin, TX (US)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,819

(22) Filed: Jan. 12, 2018

(65) Prior Publication Data

US 2018/0139301 A1    May 17, 2018

Related U.S. Application Data

(63) Continuation of application No. 14/153,863, filed on Jan. 13, 2014, now Pat. No. 9,906,615.

(60) Provisional application No. 61/770,776, filed on Feb. 28, 2013.

(51) Int. Cl.
*H04L 29/08* (2006.01)
*H04L 29/06* (2006.01)
*G06F 17/22* (2006.01)
*G06F 17/30* (2006.01)

(52) U.S. Cl.
CPC ...... *H04L 67/2823* (2013.01); *G06F 17/2247* (2013.01); *G06F 17/3089* (2013.01); *H04L 67/42* (2013.01)

(58) Field of Classification Search
CPC . H04L 67/2823; H04L 67/42; G06F 17/2247; G06F 17/3089
See application file for complete search history.

(56) References Cited

U.S. PATENT DOCUMENTS

| | | |
|---|---|---|
| 6,492,995 B1 | 12/2002 | Atkin |
| 6,623,529 B1 | 9/2003 | Lakritz |
| 7,194,506 B1 | 3/2007 | White et al. |
| 7,360,210 B1 | 4/2008 | Vacanti et al. |
| 7,958,516 B2 | 6/2011 | Buerge et al. |
| 7,972,284 B2 | 7/2011 | Mallinger |
| 7,996,417 B2 | 8/2011 | Travieso et al. |
| 8,145,521 B2 | 3/2012 | Sah et al. |
| 8,185,819 B2 | 5/2012 | Sah et al. |

(Continued)

OTHER PUBLICATIONS

Office Action for U.S. Appl. No. 13/780,329 dated Feb. 12, 2015, 10 pgs.

(Continued)

*Primary Examiner* — Patrice L Winder
(74) *Attorney, Agent, or Firm* — Sprinkle IP Law Group

(57) ABSTRACT

A website system can provide a website having features for which the status of the features can be selected. The website system can determine that a request is associated with the feature of the website and determine a status of the feature. In response to determining that the feature has a first status, the website system can return a first web page file that does not include content associated with the feature and, in response to determining that the feature has an second status, return to the client computing device a second web page file that does include the content associated with the feature.

21 Claims, 15 Drawing Sheets

(56) References Cited

U.S. PATENT DOCUMENTS

| | | | |
|---|---|---|---|
| 8,689,117 B1 | 4/2014 | Vasilik | |
| 8,812,295 B1 | 8/2014 | Swerdlow et al. | |
| 8,843,360 B1 | 9/2014 | Johnston | |
| 8,887,044 B1 | 11/2014 | Goodspeed | |
| 8,914,736 B2 | 12/2014 | Cardasco | |
| 8,942,973 B2 | 1/2015 | Viswanathan | |
| 9,164,988 B2 | 10/2015 | Blodgett et al. | |
| 9,245,032 B2* | 1/2016 | Zhang | H04L 67/02 |
| 9,519,642 B2 | 12/2016 | Johnson et al. | |
| 9,684,641 B1* | 6/2017 | Hamaker | G06F 17/2288 |
| 9,906,615 B1 | 2/2018 | Jaskiewicz | |
| 2002/0002452 A1 | 1/2002 | Christy et al. | |
| 2002/0143468 A1 | 10/2002 | Cheng | |
| 2003/0005159 A1 | 1/2003 | Kumhyr | |
| 2003/0140316 A1 | 7/2003 | Lakritz | |
| 2006/0200766 A1* | 9/2006 | Lakritz | G06F 17/28 715/234 |
| 2006/0294199 A1 | 12/2006 | Bertholf | |
| 2007/0067154 A1 | 3/2007 | Ryan, III | |
| 2007/0180143 A1 | 8/2007 | Greeff | |
| 2008/0229218 A1* | 9/2008 | Maeng | G06F 3/048 715/760 |
| 2009/0037801 A1 | 2/2009 | Ye et al. | |
| 2009/0048821 A1* | 2/2009 | Yam | G06F 17/30855 704/3 |
| 2011/0172987 A1 | 7/2011 | Kent et al. | |
| 2012/0159430 A1* | 6/2012 | Waldbaum | G06F 9/454 717/106 |
| 2012/0253814 A1* | 10/2012 | Wang | G06F 17/30905 704/260 |
| 2012/0330644 A1 | 12/2012 | Giraudy et al. | |
| 2013/0031166 A1 | 1/2013 | Jayaraman | |
| 2013/0054745 A1 | 2/2013 | Ando | |
| 2013/0262078 A1 | 10/2013 | Gleadall | |
| 2013/0282360 A1 | 10/2013 | Shimota et al. | |
| 2013/0326347 A1* | 12/2013 | Albright | G06F 9/454 715/265 |
| 2014/0108971 A1 | 4/2014 | No | |
| 2014/0222413 A1 | 8/2014 | Rossmann | |
| 2015/0161227 A1 | 6/2015 | Buryak | |
| 2017/0068663 A1 | 3/2017 | Johnson et al. | |

OTHER PUBLICATIONS

Office Action for U.S. Appl. No. 13/780,329 dated Jul. 16, 2015, 10 pgs.
Office Action for U.S. Appl. No. 14/153,863, dated Dec. 2, 2015, 14 pgs.
Office Action for U.S. Appl. No. 13/780,329, dated Feb. 9, 2016, 12 pgs.
Office Action for U.S. Appl. No. 14/153,863, dated Aug. 11, 2016, 11 pgs.
Office Action for U.S. Appl. No. 15/357,110, dated Feb. 23, 2017, 6 pgs.
Office Action for U.S. Appl. No. 14/153,863, dated Mar. 8, 2017, 11 pgs.
Office Action for U.S. Appl. No. 14/153,863, dated Jun. 28, 2017, 10 pgs.
Notice of Allowance for U.S. Appl. No. 14/153,863, dated Oct. 11, 2017, 2 pgs.

* cited by examiner

SYSTEM AND METHOD FOR SELECTIVE ACTIVATION OF SITE FEATURES

RELATED APPLICATIONS

This application is a continuation of, and claims a benefit of priority under 35 U.S.C. 120 of the filing date of U.S. patent application Ser. No. 14/153,863 filed Jan. 13, 2014, entitled "System and Method for Selective Activation of Site Features, which claims the benefit of priority under 35 U.S.C. § 119(e) to U.S. Provisional Patent Application No. 61/770,776 filed Feb. 28, 2013, entitled "Method and System for Active/Inactive Site Features," which is hereby fully incorporated by reference herein for all purposes.

BACKGROUND

Enterprises are complex organizations that often span multiple geographies, cultures, and authorities. Enterprises may include long-lived software systems such as websites that are accessible through a web-tier by a potentially unlimited number of end users. Over time, the website may be expanded to include languages, formats and other features. Through continual cycles of upgrade and redevelopment required for new and expanded functionality, enterprise-class software systems supporting enterprise websites can accrue significant cost and complexity.

The process of making content available to a website system so that the website system can distribute the content to a final target audience (e.g., World Wide Web users, corporate intranet users or other audience) is generally referred to as publication. In some publication models, website content is developed in a development environment and then published to a production environment such that the production website system can provide content to the target audience.

Publication of a website can be a time consuming process, particularly when a new version of a website is published (e.g., a version of the website in a new language, a version of the website in a new format, etc.). To address this problem, some enterprises may wait until an entire version of a website is ready and then publish the second version of the website at once. For a large website, however, the amount of content published may cause significant network delays as the content is migrated to the website's servers. In some cases, this may mean that some pages or portions of pages for the second version are available while others are not and may cause disruption of service.

This may lead to a frustrating problem for end users. In particular, an end user may see that a version of a website (or page) is available and request content associated with that version, but receive errors because the requested content for the version is not actually available yet. Consequently, today's content management systems continue to struggle with various issues such as cost and complexity involved in managing multiple versions of a website.

SUMMARY OF THE DISCLOSURE

Embodiments described herein provide systems and methods that allow for selective activation of features of a website. Through selective activation, a version of a website or portion of a website can be published without the version becoming only partially available to the target audience.

One embodiment can include a website system. The website system can include a data store storing website assets associated with a feature of a website where the feature can be selectively activated. The website system can comprise a website server coupled to the data store and a network. The website server may comprise one or more servers cooperating to provide a website.

The website server can be configured to receive a request from a client computing device for a web page comprising content associated with a feature. The website server can determine that the request is associated with the feature and determine a status of the feature. For example, the website server can determine that a request is associated with a language, presentation format or other feature of the website and determine if the language, presentation format or other feature of the website has an inactive or active status. In response to determining that the feature has a first status, the website server can provide a response comprising a first web page file that does not include the content associated with the feature. In response to determining that the feature has a second status, the website server can provide a response that does include the content associated with the feature. According to one embodiment, the website server can resolve the request to the website assets associated with the feature to assemble a second web page file containing the content associated with the feature.

One embodiment of a method can include receiving a request from a client computing device over a network for a web page that comprises content associated with a feature of a website. The method may further include determining that the request is associated with the feature of the website and determining a status of the feature. In response to determining that the feature has a first status, a response to the client computing device can be provided that includes a first web page file that does not include the content associated with the feature. In response to determining that the feature has a second status, a response can be returned that includes the content associated with the feature. According to one embodiment, the request can be resolved to a set of website assets associated with the feature and a second web page file assembled containing the content associated with the feature.

In one embodiment, the data store comprises a set of objects organized in a hierarchy with the set of objects comprising a first object and a set of content items subordinate to the first object. The web page request may request a first content item subordinate to the first object in the hierarchy. The status of the feature can be determined from metadata of the first object. If the status of the feature is the first status, a response can be provided that does not include the first content item. If the status of the feature is the second status, a response to the request can be provided that includes the first content item.

The first object can be cached in a reference cache and page fragments in a page cache. Page files can be assembled from fragments stored in cache. When an update to the status of the feature is received, the first object can be invalidated in the reference cache without invalidating page fragments associated with the feature.

Another embodiment of a system can comprise a website publication system configured to publish website assets and a website production system coupled to the website publication system by a network, the website production system configured to receive dynamic website updates from the website publication system for a website having a plurality of selectively active features. The website production system can comprise one or more server machines configured to receive requests for web pages from client devices, determine website features associated with the requests, for requests associated with inactive features, return error pages and, for requests associated with active features, generate and return pages comprising content associated with the active features.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 10 is a diagrammatic representation of one embodiment a portion of a graphical user interface for selecting the status of languages for site.

FIG. 13A is a diagrammatic representation of one embodiment of a first portion of a graphical user interface for setting the status for a format feature for content objects.

DESCRIPTION

Figure 1:
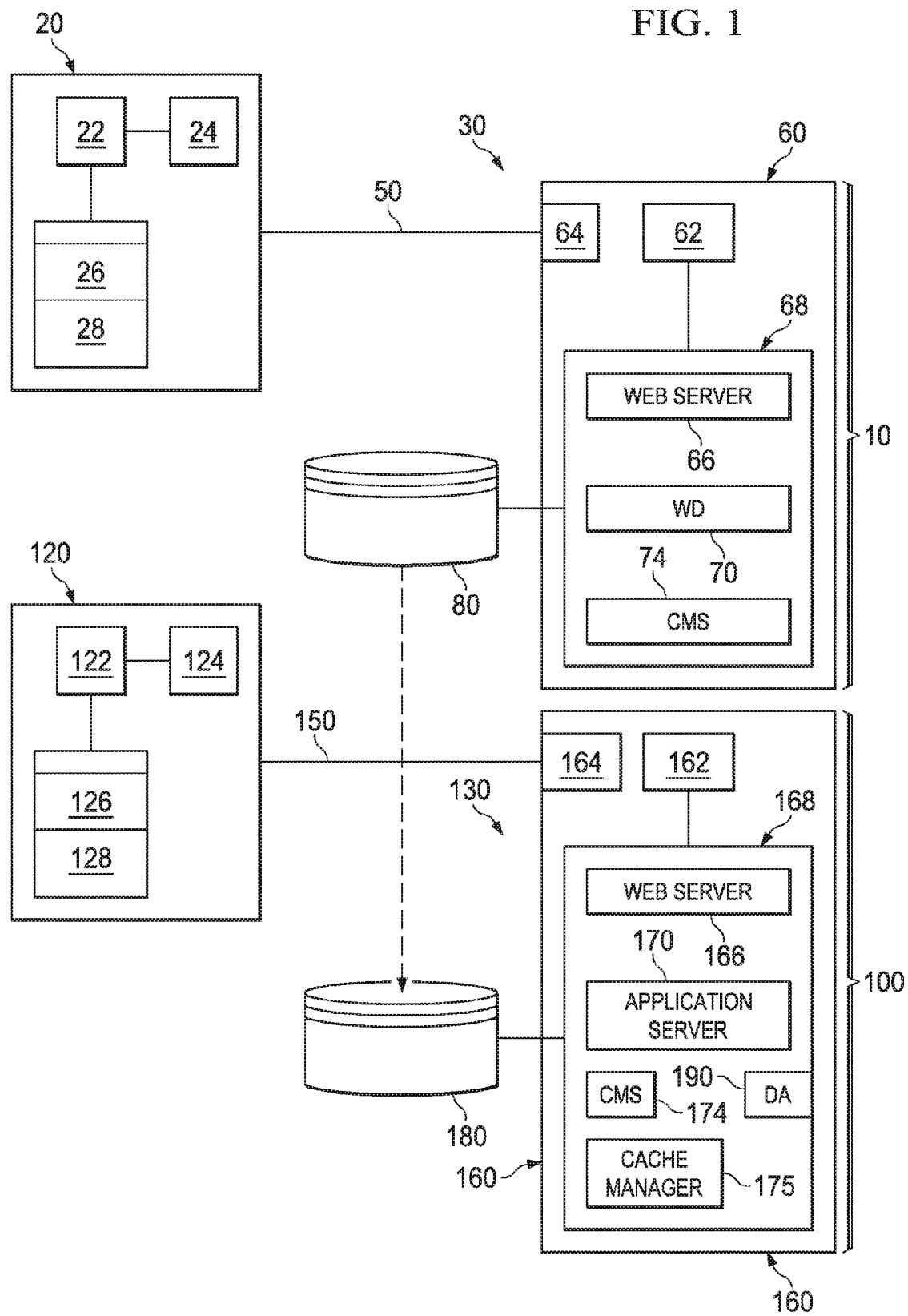
FIG. 1 is a diagrammatic representation of an example client-server computer system having a development stage and a production stage.

Systems and methods for selective activation of site features and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the systems and methods, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, a brief overview of the context of the disclosure may be helpful. As part of the process of deploying a website, site content may be "published" from a development environment to a production environment. Generally, when content is published it is transferred to a production server and is made available from the production system on the World Wide Web, intranet or other target environment.

Publication methods can be classified as non-dynamic or dynamic. In non-dynamic systems, content or other assets are transferred to a production system, but are not made available to the application servers of the system until the assets are placed in appropriate directories and the application servers reconfigured to reference the directories. Typically, this process involves a system administrator or other user managing movement of the assets and configuration of the application servers. In dynamic publications systems, on the other hand, website assets are deployed to a website repository at resolvable locations and become active by virtue of their publication such that they are immediately usable by the website system's application servers. An agent program in the production environment can receive the website assets and place the assets in the appropriate repository locations, change the doc root filings and take other actions to make the content immediately available.

In some cases, a large number of assets are published at once. For example, if a website owner is rolling out a French language version of the site, all the content for the French language version will typically be published together. This can cause a large amount of data to be transferred from a website development system to the production system at one time, leading to significant delay before some content becomes available. This creates a problem, particularly for dynamic publication systems, because the visitor may be able access some portions of the new version of the website but receive errors when trying to access other portions. The traditional remedy to this problem has been to publish content at times of relatively low traffic to minimize users experiencing errors.

Embodiments described herein provide systems and methods to publish websites while easily enabling and disabling features of the website. Groups of website content can be made available to a production system as published content (viewable and active internally), but in an inactive state so that it is not immediately made available to website visitors. The state of the content can be changed to an active state allowing the content to become immediately available to the website system's servers when resolving client requests. This can be done, in one embodiment, without moving the website assets to a resolvable location or changing the document root files.

Referring now to FIG. 1, an example client-server computer system includes a development and publication stage 10 ("development stage 10") and a production stage 100. Development stage 10 is the stage at which a website and updates to the website are developed and production stage 100 is the stage at which a website is made available to the final target audience (e.g., over the Internet, corporate Intranet or other network).

Development stage 10 includes client devices such as client device 20 and a website development system 30 comprising one or more server machines such as server machine 60. As illustrated in FIG. 1, client devices 20 and server machine 60 can be connected via standard transmission channel 50, which may be a wired and/or wireless network including a local area network (LAN), wide area network (WAN), the internet, or other wired and/or wireless network.

Each client device in development stage 10 (e.g., client devices 20) can include a central processing unit ("CPU") (e.g., CPU 22), a network connection device (e.g., network interface 24), and a non-transitory computer readable medium (e.g., computer readable medium 28). Computer readable medium 28 can comprise any combination of a primary memory, a secondary memory, a random access memory (RAM), a read only memory (ROM), and/or a magnetic storage device such as a hard drive (HD) or other non-transitory computer readable storage medium. Each computer readable medium may store a number of computer programs. For example, computer readable medium 28 may store a site management program 26.

According to one embodiment, site management program 26 can be an application that runs site management functionality in a browser runtime environment. According to one embodiment, site management program 26 can be a web browser running an Adobe Flash program, a Java program, a scripting language application, or an AJAX (Asynchronous JavaScript and XML) application operating in a web browser runtime environment, or be standalone program. The application can be used to communicate with remote server computers such as server machine 60 and to visually present the information received from server machine 60.

Server machine 60 can include a plurality of server computer components, including a CPU 62, a network connection device 64, and a non-transitory computer readable medium 68. Computer readable medium 68 can comprise any combination of a primary memory, a secondary memory, a RAM, a ROM, and/or a magnetic storage device such as a HD or other non-transitory computer readable storage medium. Computer readable medium 68 may store a number of computer programs.

As shown in FIG. 1, server machine 60 can act as a web server executing web server program 66 for servicing requests from client devices such as client devices 20 over transmission channel 50. Server machine 60 can also act as a website development system storing a website development program (WD 70). According to one embodiment WD 70 can provide a web server and application server to respond to requests, to generate web page files for web pages provided to clients (web page in this context can refer to an overall web page or a portion of web page, either of which may be made up of one or more fragments) and provide tools to manage editing, creation, lifecycle management, staging of content. Server machine 60 can also act as a content management system executing a content management system application 74 (CMS 74) to manage content in a repository 80. WD 70 can interface with CMS 74 to access or manage content through an API or through another interface.

Content and related information managed by WD 70 can be stored in repository 80. WD 70 and repository 80 can be used to create, test, modify, manage and store content and other assets belonging to an entity. To this end, client devices such as client device 20 can be used by administrators and enterprise users to access WD 70 and repository 80. Site management program 26 can interface with WD 70 running on server machine 60, requesting information from repository 80 and/or causing WD 70 to take appropriate action, and visually present the information received from WD 70.

Repository 80 may contain website assets. The collection of assets in site repository 80 may include file assets and non-file assets for one or more websites. Non-file assets include assets defining users, groups, modules, module types, pages (complete pages or fragments of pages), menus, themes, structures, styles and templates, logon permissions, administrative permissions, site branding, site content, site navigation, instantiated programming language objects, permissions, user preferences and settings. File assets may include resources such as code including JSP pages, ASP pages, Java classes and/or object oriented programming language classes, image files, multi-media files, text files, etc.

Production stage 100 includes client devices such as client device 120 and a website system 130 comprising one or more server machines such as server machine 160. As illustrated in FIG. 1, client devices 120 and server machine 160 can be connected via standard transmission channel 150, which may be a wired and/or wireless network including a local area network (LAN), wide area network (WAN), the internet, or other wired and/or wireless network.

Each client device in production stage 100 (e.g., client devices 120) include a central processing unit ("CPU") (e.g., CPU 122), a network connection device (e.g., network interface 124), and a non-transitory computer readable medium (e.g., computer readable medium 128). Computer readable medium 128 can comprise any combination of a primary memory, a secondary memory, a random access memory (RAM), a read only memory (ROM), and/or a magnetic storage device such as a hard drive (HD) or other non-transitory computer readable storage medium. Each computer readable medium may store a number of computer programs. For example, computer readable medium 128 may store a browser application 126. As known to those in the art, a browser application can be used to communicate with remote server computers such as server machine 160 and to visually present the information received from server machine 160. Server machine 160 may host a network site and a network site visitor may visit the network site using browser 126 running on client device 120. Each client device can establish network communications through transmission channel 150.

Server machine 160 can include a plurality of server computer components, including a CPU 162, a network connection device 164, and a non-transitory computer readable medium 168. Computer readable medium 168 can comprise any combination of a primary memory, a secondary memory, a RAM, a ROM, and/or a magnetic storage device such as a HD or other non-transitory computer readable storage medium. Computer readable medium 168 may store a number of computer programs. As shown in FIG. 1, server machine 160 stores web server program 166 for servicing requests from client devices such as client devices 120 over transmission channel 150. Server machine 160 can also store an application server program 170. Application server program 170 can generates web page files for web pages provided to clients.

Server machine 160 can also include a content management system application 174 (CMS 174) to manage content in a repository 180. Repository 180 may contain website assets. The collection of assets in site repository 180 may include file assets and non-file assets for one or more websites. Application server program 170 can interface with CMS 174 to request content.

Server machine 160 may further include a cache management application 175. One or more levels of cache can be employed to store commonly used pages, fragments of pages and other assets. In some cases, assets may be cached at other servers or systems, including caching servers controlled by third parties.

Server machine 160 may also include a deployment agent ("DA") 190. Deployment agent 190 can receive website assets from WD 70 and store the assets at appropriate locations in repository 180 so that the assets are immediately available to web server 166 application servers 170 or CMS 174. Any method for website asset deployment known or used in the art may be used.

When a client device 120 requests a web page, web server program 166 may pass the request to application server program 170, which resolves the request to return an existing web page file or to generate a web page file having the appropriate content. Generating a web page file may include assembling a web page file from fragments of the web page source and other assets that are cached or stored in repository 180 or generating new page source.

When a website or portion of a website is ready to be made available to the public or other target audience, development server 60 can act as a publication system to publish assets from repository 80 to production repository 180 to update the production website. According to one embodiment, the assets may be published according to a dynamic publication model. To this end, deployment agent 190 may receive the assets and store the assets in repository 180, updates webserver and application server document root files and take other actions to make the assets immediately available to web server program 166 or application server program 170.

Features of a website, such as the availability in a particular language or particular formatting may be classified as active or inactive. When assets corresponding to the feature are published and the feature is inactive, the feature can be hidden from end users. Application server program 170 can be configured to resolve requests based the status of features associated with the request. If a feature is inactive, server machine 160 may generate a first web page file or otherwise provide a web page file that does not contain the content associated with the feature (e.g., for an error page or a default page). If the feature is active, server machine 160 can use the website assets associated with the feature to assemble a second web page file that does include the content associated with the feature.

At a selected time, such as when all the website assets corresponding to the feature are published, an inactive feature can be changed to active and thereby become available. In one embodiment, this can be accomplished by changing a single piece of metadata or a limited amount of metadata and without having to move the assets to new locations in repository 180. The document root file content does not have to be modified nor the website assets copied to new locations to make them accessible to the web server program 166 or application server program 170.

Figure 2A:
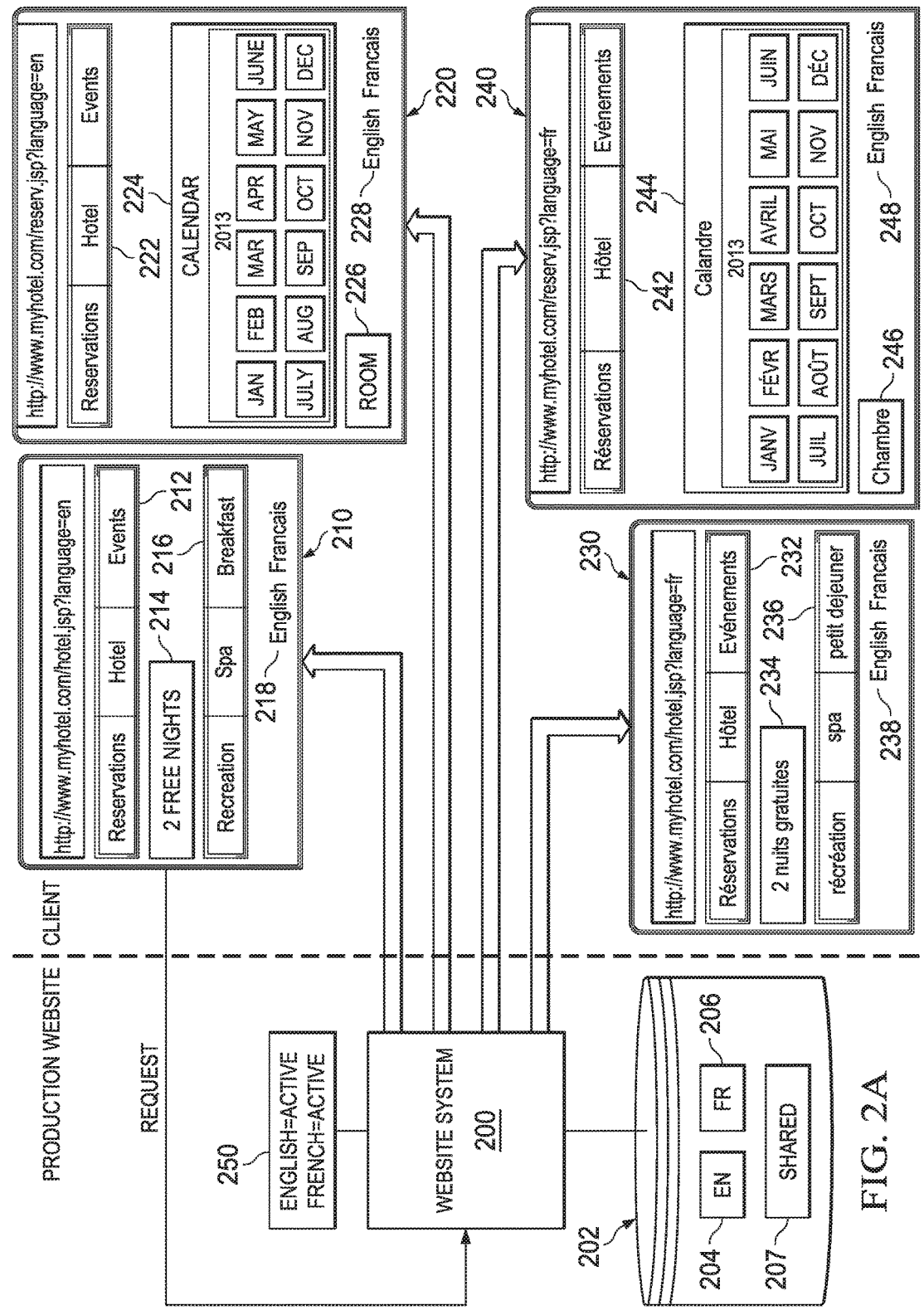
FIG. 2A is a diagrammatic representation of an embodiment of a website system configured to provide English and French versions of web pages for a hotel website.
Figure 2B:
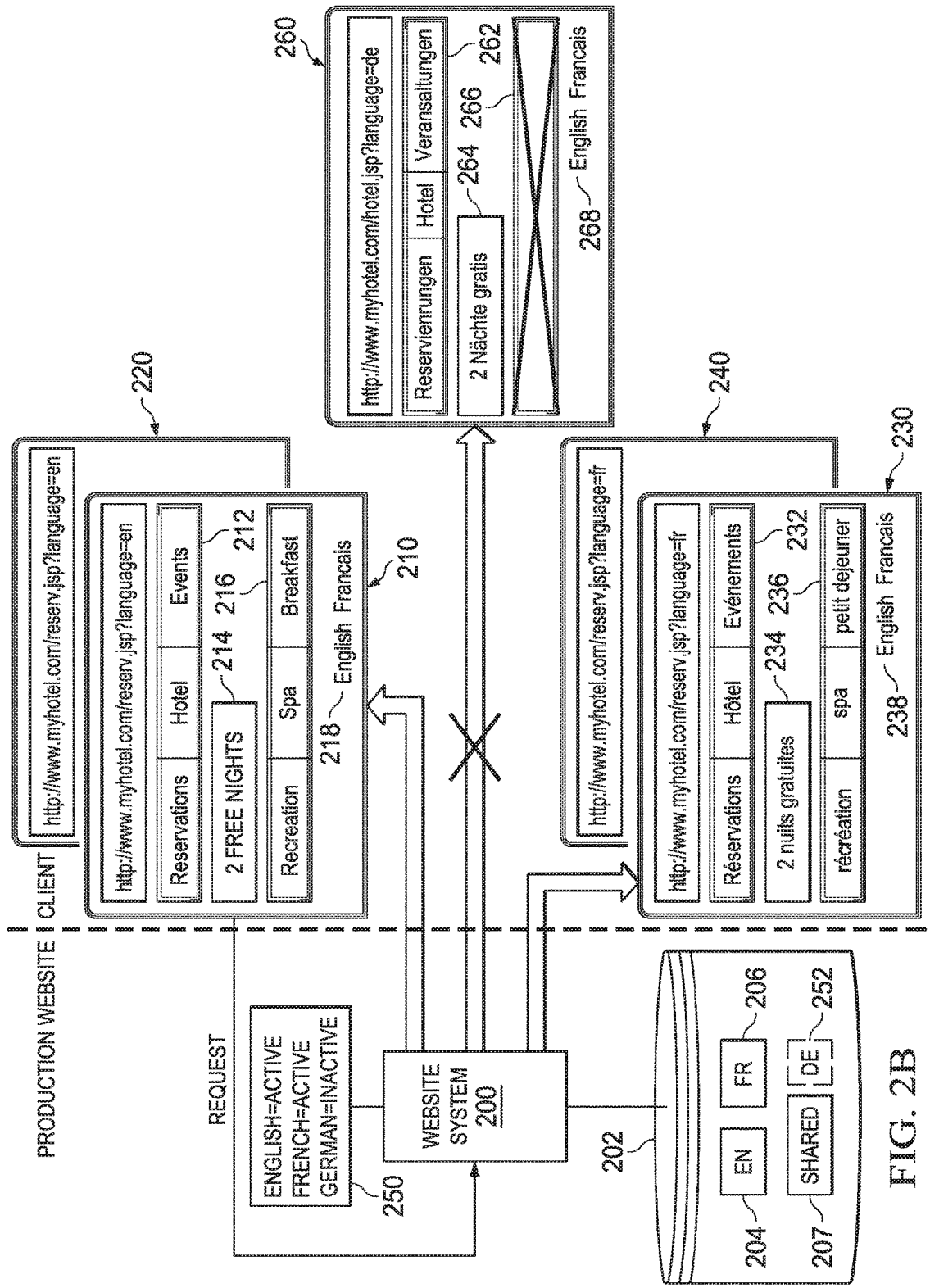
FIG. 2B is a diagrammatic representation of an embodiment of a website system configured to provide English and French versions of web pages for a hotel website and with assets for generating a German version of the web pages partially deployed.
Figure 2C:
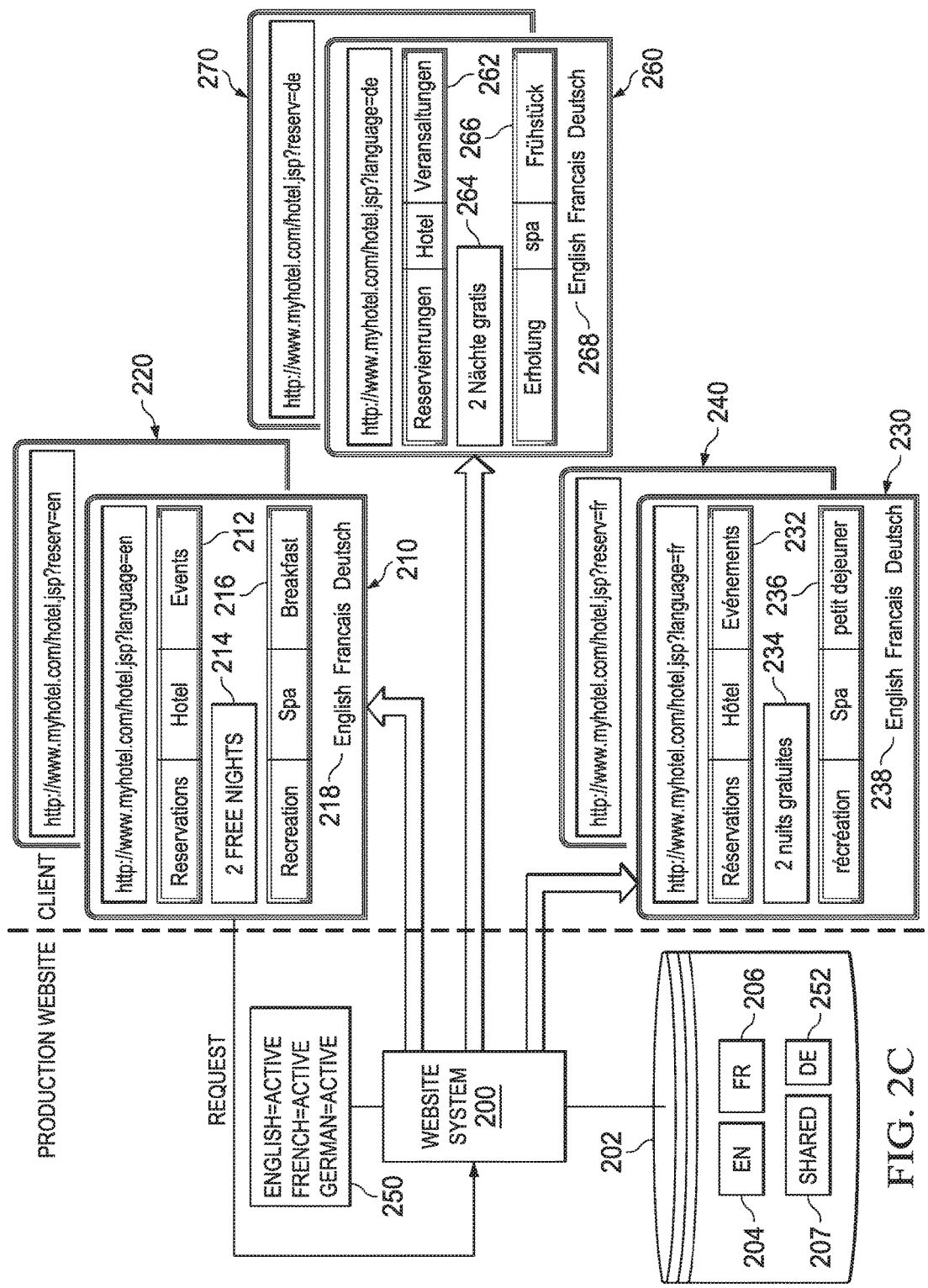
FIG. 2C is a diagrammatic representation of an embodiment of a website system configured to provide English, French and German versions of the hotel web pages.

FIGS. 2A-2C are diagrammatic representations of a website system 200 providing source files (HTML or other language) to a client that the client renders as web pages. FIG. 2A is a diagrammatic representation of website system 200 configured to provide English and French versions of web pages for a hotel website. Accordingly, website system 200 can comprise one or more computing devices that maintain a data store 202 of website assets stored in one or more storage locations including in cache. For the purposes of example, the website assets include English language website assets 204, French language website assets 206 and shared assets 207. These assets can include or be used by website system 200 to generate English language and French language pieces of content that are assembled into a page source file for an English language page. The assets may be associated with features of the website (e.g., English language or French language). For example, an asset may be considered a member of English language assets 204 by virtue of its association with the English language feature.

The status of a defined feature can be explicitly set in metadata or elsewhere for features explicitly associated with the website or a portion of the website. In the example of FIG. 2A, website system 200 maintains a set of metadata 250 that indicates whether certain site features are active or inactive. In this case, metadata 250 indicates that English is active and French is active. Because the English language feature and French language feature are active, website system 200 will resolve requests using English language assets 204 and French language assets 206 as appropriate to provide English language content and French language content.

While metadata 250 is set for the site as a whole in FIG. 2A, metadata 250 may also be set for portions of a website (e.g., groups of pages). Thus, for example, different active/inactive statuses may apply to the homepages versus the reservations pages.

FIG. 2A illustrates examples of English language content and French language content including English homepage 210, English reservations page 220, French homepage 230 and French reservations page 240. English homepage 210 and French homepage 230 each have various pieces of content including navigation menu (navigation menu 212 and navigation menu 232), special offer content (content area 214 and content area 234) and hotel amenities content (content area 216 and content area 236). The homepages may further include a language selection menu (language selection menu 218 and language selection menu 238). English reservation page 220 and French reservations page 240 may also include various pieces of content including a navigation menu (navigation menu 222 and navigation menu 242), an interactive calendar (interactive calendar 224 and interactive calendar 244), a content area showing pictures of rooms (content area 226 and content area 246, and a language selection menu (language selection menu 228 and language selection menu 248).

Website system 200 may differentiate whether the user is requesting a web page containing English content or French content based on parameters contained in a request or other information. For example, website system 200 may use the location portion of the URL (e.g., http://www.myhotel.com/en/hotels.jsp versus http://www.myhotel.com/fr/hotels.jsp), parameters in the URL (e.g., http://www.myhotel.com/hotels.jsp?language=en versus http://www.myhotel.com/hotels.jsp?language=fr) or other aspect of the request (or other information). In this example, the website language is referenced by a parameter in the request "?language=" and thus, website system 200 can determine whether the request is associated with the English language feature or French language feature.

When a client makes a request for http://www.myhotel.com/hotels.jsp?language=en, website system 200 can process English language assets 204 and shared assets 207 to produce the source file for English language homepage 210 containing English language pieces of content, whereas when a client makes a request for http://www.myhotel.com/hotels.jsp?language=fr application server 200 can process English language assets 204 and shared assets 207 to produce the source file for French language homepage 230 containing French language pieces of content.

A user may switch from an English language version of the website to the French language version of the website. For example, if the user is viewing English language homepage 210 and clicks on "Francais" in language selection menu 218, the user's browser can generate a request for French language homepage 230. The user can navigate to English language reservations page 220 by selecting "reservations" in navigation menu 222 or, if the user is viewing French language reservations page 240, by selecting English in language selection menu 248. The user may navigate to French language reservations page 240 by selecting "Reservations" in navigation menu 232 in French language homepage 230 or, if viewing English language reservations page 220, selecting "Francais" in language selection menu 228. In other embodiments, the user may not be given the option to select the language. Instead, the website system may determine the language for a user based on IP address, a user profile or other information.

FIG. 2B is a diagrammatic representation of website system 200 configured to provide English and French versions of web pages for a hotel website and with assets for generating a German version of the web pages partially deployed. German language assets 252 may be published to data store 202 using a dynamic update model. However, there may be a period of time in which only a portion of the German language assets 252 used to assemble the source files for the German language pages are published. For example, the German language assets to generate German language homepage 260 having navigation menu 262, special offer content (content area 264) and language selection menu 268 may be available in data store 202 while the German language assets corresponding to hotel amenities (content area 266) and the German language reservations page are not yet fully published to data store 202. In this situation, an error may result if a user requests a German language page. For example, a request for German language homepage 260 may result in an error because the pieces of content used to create the German language version of content area 266 are not available. Similarly, a request for the German language reservations page may result in an error because the assets for the German language reservations page are not yet fully published.

Metadata 250 may be updated, however, to indicate that German is inactive. Consequently, website system 200 may hide the German language features from clients and not resolve requests to German language assets 252. Hiding features can include generating source files that do not reference the feature or link to pages associated with the feature. As an example, the assets used to generate source for language selection menu 218, language selection menu 238 and language selection menu 268 may include scripts that reference active languages. When website system 200 processes these assets, it can read metadata 250 and "gray-out" unavailable options, only present options for active languages, thus hiding the German language feature from clients, or otherwise limiting the availability of language features. Furthermore, if a request is made for German language homepage 260 (e.g., by the user typing http://www.myhotel.com/hotels.jsp?language=de in a browser, the user making a request based on a bookmarked page, etc.) website system 200 may return an error (e.g., a 404 error, a customized error page or default content (e.g., the English language homepage 200)). In some cases, website system 200 can return previously generated German language content (e.g., a cached version of the German language homepage) if previously generated content is available and depending on the caching configuration.

Once all the assets for the German language version are published (or at another selected time), the German language can be set to active in metadata 250. To this end, FIG. 2C is a diagrammatic representation of website system 200 configured to provide English, French and German versions of the hotel web pages. With the German language feature set to active, the German language feature can be made immediately available in web pages returned in response to subsequent requests. For example, a German language option may appear in language selection menus 218, 228 and 268 and the application server may resolve requests to the German language assets to provide a page file for German language homepage 260 and German language reservations page 270.

Thus, when the website server receives a request for a web page containing German language pieces of content, the website server can determine that the request is associated with the German language feature of the site and determine if German is inactive or active. If German is inactive, the website system can generate a web page file that does not include the pieces of content associated with the feature (that is, the German language content contained in or generated from German language assets 252), whereas if German is active, the website system can generate a web page file that does include the content associated with the feature.

By allowing the state of the German language feature to be set to an inactive state, the German language assets can be deployed using a dynamic content deployment model without a partially published version of the German language site becoming available before deployment is complete. Once deployment is complete (or at another selected time), the German language content may be made available all at once by changing a single piece or limited amount of metadata. While the example of language is used, other features of a site may be set to active/inactive, including, but not limited to, presentation formats (e.g., web, mobile, print) and other features.

Moreover, the response by website system 200 can depend on the status of a combination of features. For example, if user requests a mobile version of an English page, where English is active, but mobile is inactive, the website system 200 may return an error page or a default page (e.g., the English version of the page in web presentation mode).

Figure 3:
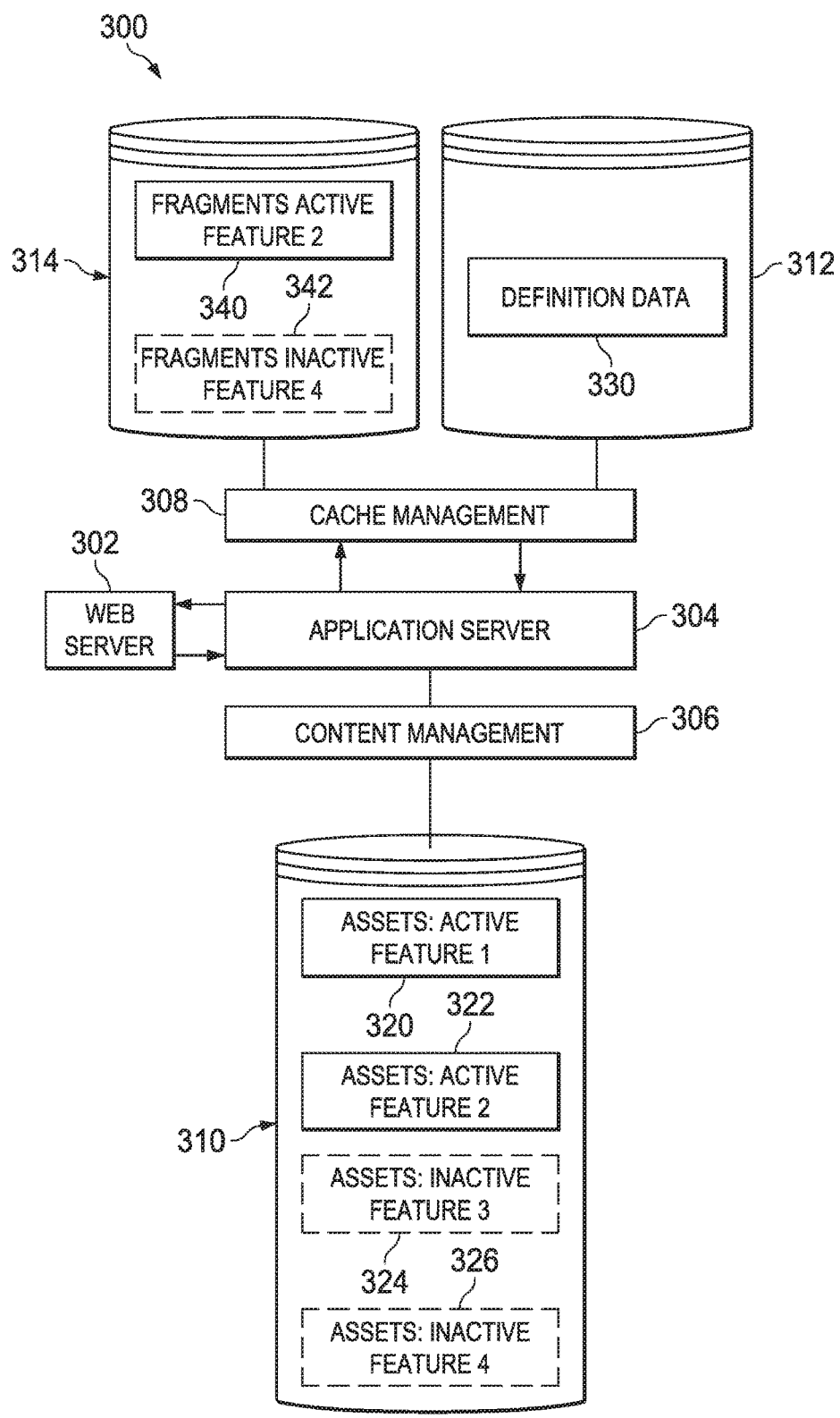
FIG. 3 is a block diagram illustrating one embodiment of a website system.

Website systems (e.g., production server machine 160, website system 200 and other website systems) may provide caching. The cache management processes can take into account status changes of website features. FIG. 3 is a block diagram illustrating one embodiment of a website system 300 comprising website servers including a web server 302, an application server 304, a content management system 306 and a cache management system 308. Web server 302, application server 304, content management system 306 and cache management system 308 may comprise one or more computing devices executing a web server application, application server application, content management system application and cache management applications (e.g., as shown by server machine 160 of FIG. 1).

Content management system 306 may maintain a repository 310 of website assets that comprise web pages, fragments of web pages or assets used to build web pages or fragments of web pages. Repository 310 may contain assets corresponding to active and inactive features. In the example of FIG. 3, repository 310 includes assets 320 for Active Feature 1, assets 322 for Active Feature 2, assets 324 for Inactive Feature 3 and assets 326 for Inactive Feature 4.

Cache management system 308 may maintain a reference cache 312 and a page cache 314. Reference cache 312 can include a cache of definition data 330 (e.g., metadata, objects, or other information) processed by application server 304 to resolve requests to locate or generate appropriate content to respond to the requests. Page cache 314 can include fragments of page source, resources and other content that is assembled into web page source files. Fragments can be associated with specific features using metadata.

Page cache 314 and reference cache 312 may be portions of the same cache or may be separately managed caches. In general, though, reference cache 312 and page cache 314 may be stored in locations that allow for faster retrieval than from data store 310 (e.g., in memory, on faster computer readable mediums, at locations that takes less time to access due to network configuration, etc.). Furthermore, reference cache 312 and page cache 314 may comprise multi-tiered caches.

In general, when a request for a web page is received from a client, web server 302 can distribute the request to the appropriate application server(s) 304. The application server 304 can access reference cache 312 and process definition data 330 to resolve the request to various fragments of page source or assets used to generate fragments of page source that make up the web page. If an appropriate fragment is in page cache 314, the application server 304 can retrieve the fragment from page cache 314. For fragments not in page cache 314, the application server 304 can retrieve the corresponding assets from reference cache 312 or repository 310 and, if necessary, generate the appropriate source from those assets. Application server 304 can assemble a web page file for the requested web page using the assets retrieved from reference cache 312, page cache 314 and repository 310 and return the web page file to web server 302 for distribution to the client.

For a request requesting content corresponding to an active feature for which page fragments are not already cached in page cache 314, application server 304 can retrieve or generate the appropriate fragments from assets in repository 310 or reference cache 312 (if available), assemble a web page file and return the web page file to web server 302. Additionally, application server 304 can cache the generated (or retrieved) fragments in page cache 314. For example, if a request corresponding to Active Feature 1 is received, application server 304 can render page fragments (or other assets) using assets 320 and assemble a responsive page file. Application server 304 can cache the fragments in page cache 314 for future use and, in some cases, cache the assets used to generate the fragments or resolve the request in reference cache 312.

For an active feature for which page fragments are already cached in page cache 314, the fragments can be retrieved from page cache 314. In the example of FIG. 3, if application server 304 receives a request for a page corresponding to Active Feature 2, application server 304 may retrieve fragments 340 that correspond to Feature 2 from page cache 314 and assemble the web page file from cached fragments. If some fragments are missing from page cache 314, application server 304 can generate or retrieve the missing fragments from assets in reference cache 312 (if available) or repository 310 and cache the fragments in page cache 314.

For inactive features where page fragments are not already cached in page cache 314, the application server 304 does not generate a web page file using the associated assets. Thus, for example, application server 304 will not use assets 324 to generate content for a page file because Feature 3 is inactive (e.g., if Spanish is inactive, application server 304 will not render Spanish language fragments from assets 324). Consequently, page fragments (or other assets) corresponding to Feature 3 will not be rendered and will not be cached.

A situation may occur when a feature is inactive, but fragments or other content corresponding to that feature have been cached in page cache 314. This can occur, for example, when a feature is changed from an active status to an inactive status. In FIG. 3, for example, page cache 314 may include cached fragments 342 associated with Inactive Feature 4.

This may lead to a problem if a user requests content associated with an inactive feature (e.g., if the user had bookmarked a link to page associated with a previously active feature), because application server 304 can retrieve fragments associated with the inactive feature from cache to respond to request. For example, if application server 304 receives a request for a web page corresponding to Inactive Feature 4 (e.g., a German language page), application server 304 may access definition data 330, resolve the request to retrieve fragments 342 and attempt to build a web page file to respond to the request, despite the fact that the feature is inactive.

A mechanism can be provided to prevent website system 300 from returning cached fragments (or other assets) corresponding to an inactive feature. According to one embodiment, the status of a feature is changed, the fragments (and other assets) in page cache 314 associated with the feature are not immediately invalidated. However, the definitional data 330 in the reference cache 312 may be invalidated. For example, if an administrator modifies a site to deactivate Feature 4, fragments 342 are not immediately invalidated, but definitional data 330 in reference cache 312 is invalidated. When a subsequent request for the site is handled, the assets of the site can accessed from repository 310 and the metadata in reference cache 312 updated to reflect that the feature is inactive. Consequently, a request for a page containing content corresponding to an inactive feature will not be resolved to that content.

Continuing with the previous example, when Feature 4 is changed from active to inactive, definition data 330 can be updated to reflect that Feature 4 is inactive. Thus, application server 304 will not resolve the request for a web page containing fragments 342 and will return an error page, default page or take other action based on the receipt of a request for a web page comprising content associated with an inactive feature.

Not immediately invalidating fragments 342 provides that advantage that if the feature is changed back to an "active" status relatively quickly, the fragments 342 do not have to be regenerated. As another advantage, fragments 342 will still be available from cache if Feature 4 is only inactive for part of the website, but is active for other portions of the website. However, in other embodiments, fragments corresponding to a feature can be invalidated immediately when the status of feature is changed to inactive at the website system.

Fragments (or other assets) may be cleared from page cache 314 and reference cache 312 according to any cache management scheme known or developed in the art including but not limited to: i) explicitly by user request; ii) changes to an underlying asset that causes a fragment generated based on that asset to no longer be valid; iii) TTL (time to live expires); iv) the item is pushed out of the cache due to least recently used policy.

Figure 4:
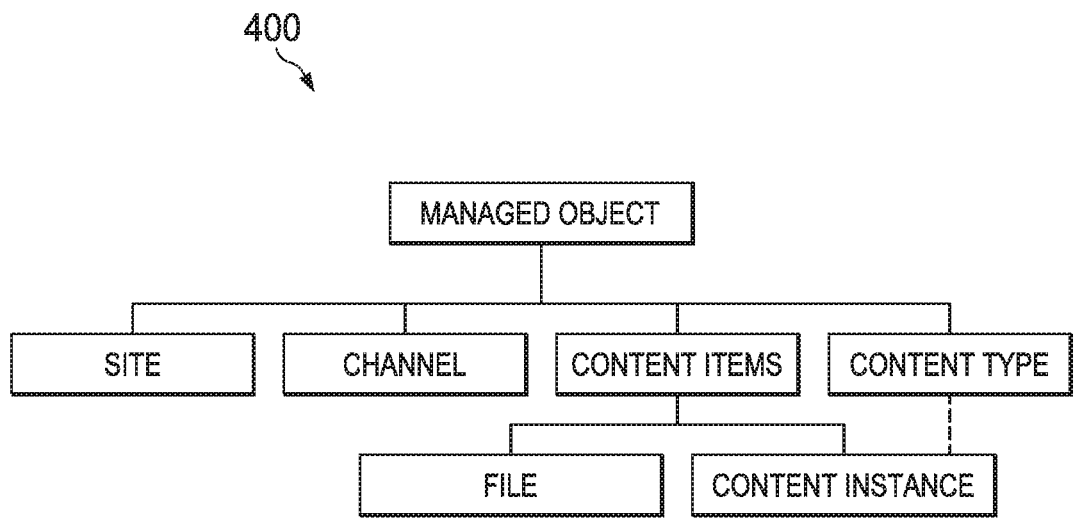
FIG. 4 depicts one embodiment of an object-model in which content and other aspects of a website are organized.

Referring now to FIG. 4, according to one embodiment, website assets may be organized according to an object-model in which content and other aspects of a website are organized as a hierarchy of objects. Examples of objects include:

Site: A "site" object refers to a logical container for content instances and channels representing a site structure. A site object serves as the definition of the online endpoint (which can be a website) for content published to the web.

Channel: A "channel" object refers to a logical node in a site structure to which content items can be associated. In this context, "channels" can be used to organize and manage user access to managed content. As a specific example, a website may have channels such as news, sports, entertainment, etc., each being defined by a channel object in the site navigation tree of the website and accessible by visitors of the website through, for instance, a page or a link in the website domain.

Content type: A "content type" object contains a logical definition for a piece of structured content. In some embodiments, a website development system may support content types that meet common content management and presentation management requirements (e.g., Images, Videos, Pages, Regions, Components, Themes, and more.)

Content instance: A "content instance" object refers to an individual piece of content created from a given content type definition (contained in a "content type" object).

Static file: A "static file" object refers to any individual file uploaded and managed by the content management system.

Each of the objects types listed above can be defined by a variable number of attributes (e.g., name and description are default attributes for each object) with default settings which can be configured if needed. Those skilled in the art will appreciate that the objects types listed above are meant to be exemplary and non-limiting and that additional object types not listed here are possible and anticipated.

Instances of the object types above are called "managed objects", which obey a number of predetermined rules and properties when it comes to the content life cycle and the security model (e.g., logical placement in the repository, approval and publishing rules, etc.). Each instance of an object may include metadata such as: a global unique identifier (GUID), security related information (e.g., access control list), creation date, creator, modification date, modifier, path within a content hierarchy, approval status, publishing status, scheduled publish and unpublish dates and other metadata.

Content management object model 400 may be utilized to manage content for websites. Each website may have a collection of objects, including file assets and non-file assets. Non-file assets can include assets such as users, groups, modules, module types, pages, menus, themes, structures, styles and templates, logon permissions, administrative permissions, site branding, site content, site navigation, instantiated programming language objects, permissions, user preferences and settings. Various content objects may reference file assets including resources such as code including JSP pages, ASP pages, Java classes and/or object oriented programming language classes, images including GIF files, and resources. It should be noted that such assets belonging to an entity may be shared among the entity's websites and thus the collections of objects for the websites need not be mutually exclusive.

A "content item" may represent a managed piece of content that is either of the "content instance" object type or of the "static file" object type described above. Content items can be stored as corresponding content objects in a repository. In some cases, rather than storing the content items, the repository can include references to another system and its corresponding objects or repository. Each content object can have an arbitrary amount of metadata associated with it. For purposes of website management, such metadata may include whether the content object has been approved for publication, whether it was published, or any other information that is useful in classifying the content object for website management.

It should be noted that managed objects can be stored at a single central location or they can be distributed. For example, a content item may be stored at another location and a reference to the content item stored in a repository. As a specific example, a bank statement may reside in an enterprise system and a reference to the bank statement may be stored in a website repository.

Figure 5A:
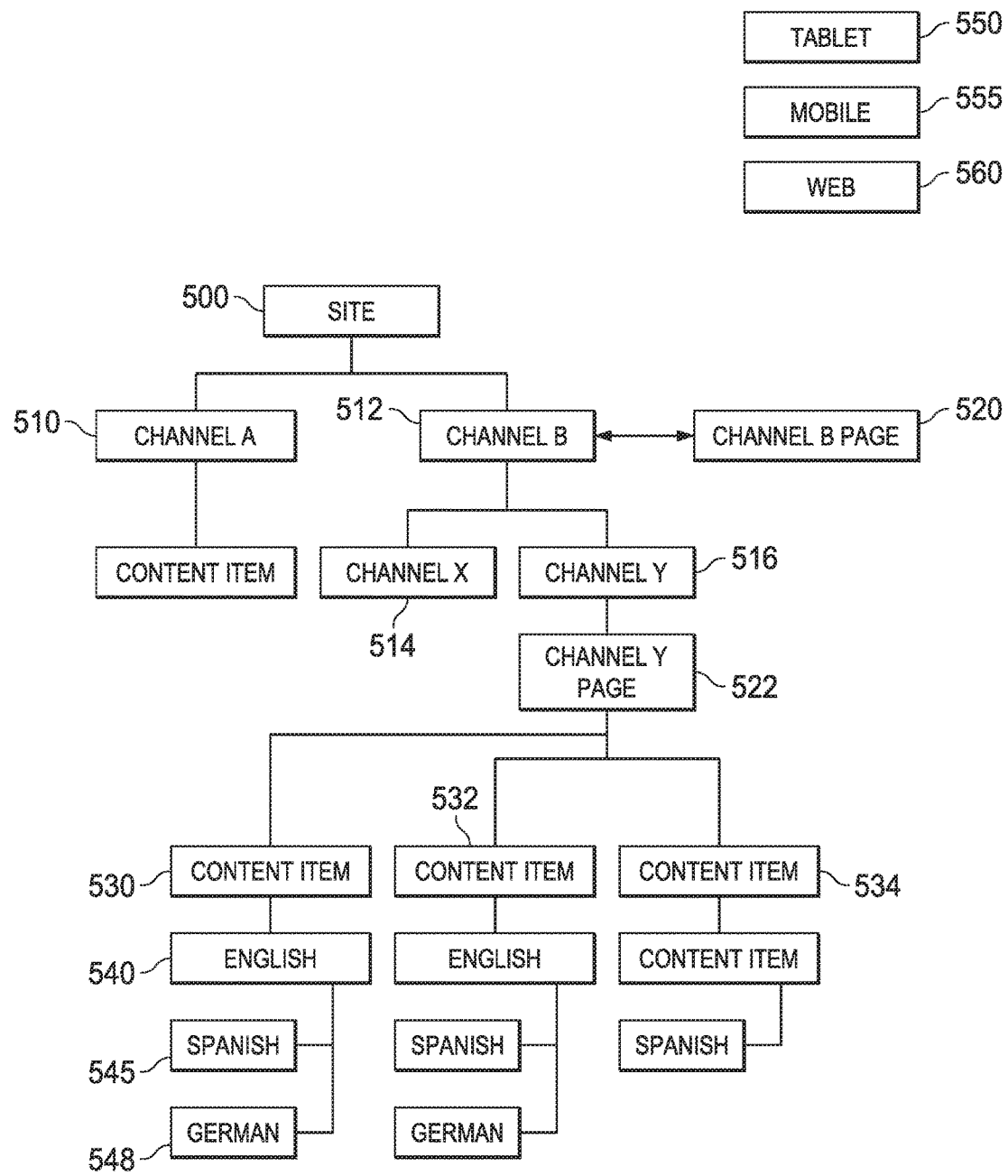
FIG. 5A is a diagrammatic representation of one embodiment of a website hierarchy.

FIG. 5A is a diagrammatic representation of one embodiment of a website hierarchy. According to one embodiment, a repository can store website assets according to a set of objects organized in a hierarchy. The hierarchy can include objects and subordinate content items. In this context, subordinate refers to being further away from the site object in the path for resolving requests in the hierarchy. Thus, in resolving requests, higher level objects in the path will be processed before subordinate objects. According to one embodiment, the website can be organized as a site object 500, one or more channel objects 510, 512, one or more subchannels 514, 516 and one or more content items. Content items may reference other content items.

A channel page item may be associated with channels. For example, Channel B page item 520 can provide a definition for all pages associated with Channel B and Channel Page Y Page Item 522 can provide a definition for all pages associated with Channel Y. The usefulness of channel pages can be seen in the context of a website that provides multiple forms of information, appeals to multiple interests or is tailored for multiple locales. Using the example of a news site, Channel A can be a "Politics" channel and Channel B a "Sports" channel. Furthermore, Subchannel X can be "Football" channel and Subchannel Y can be a "Hockey" channel. All the web pages corresponding to Channel B can include the navigation information and other content specified in the Channel B page content object 520 regardless of whether they are Football or Hockey related pages. Similarly, all the Hockey related pages can further include the content, navigation information, etc. specified in the Channel Y content page item 522.

Some content items can specify how content is structured in a page. For example, the web page content items 530 and 532 may define how portions of a web page containing hockey story items are displayed. The Channel Y content item 522 may refer to three regions, represented at content items 530, 532, and 534 and the regions may refer to specific content items contained in each region (which may be subpages, components or the like). Thus for example, content item 530 may define a region in Channel Y page 522 that contains content item 540. For different channel Y pages, the content items 530, 532 and 536 may refer to different content items contained in each region. That is, different Channel Y pages (e.g., different hockey pages) may contain the same regions, but have different content in those regions.

In some cases, content items may have multiple languages, formats and characteristics. For example, the website may support multilingual content items, such as English, Spanish and German versions of content referenced by content Item 530 (for example, English 540, Spanish 545 and German 548 versions of a hockey story, navigation button, menu, list of top stories or the like). Therefore, for an English language version of the Channel Y page, content item 530 may reference English content item 540, whereas for a German language version of a Channel Y page, content item 530 may refer to German content item 548. In other embodiments, the content item 530 for both pages may refer to a reference associated with a translation group that resolves to the appropriate version of a content item as discussed in more detail below.

Furthermore, a website may be associated with one or more presentations. Thus, the website may define methods and objects for presenting data in different formats. For example, the website may include objects and methods for presenting data to a tablet (represented at tablet formatting 550), mobile device (represented at mobile device formatting 555) or desktop web browsers (represented at web formatting 560).

As is understood in the art, responding to a request for content may involve multiple references to various types of managed objects. For example, a request for content may require referencing a site, a channel, a subchannel and one or more content items which, in turn, may contain one or more references to one or more content items, etc. As described above, each content item can be a content instance or a static file, each of which may contain zero or more references to other content instances and/or static files. All of these references can be resolved correctly, timely, and efficiently. To facilitate this process, metadata may be utilized.

Metadata for managed objects such as sites, channels, and/or content items can be stored in a data structure. Metadata may include a global unique identifier (GUID), a name, and a language for a managed object, and an identification of a translation group or other content group (discussed below) to which the managed object is assigned, formatting versions of the managed objects, whether the content item is multilingual and the like.

When a website receives a request it can resolve certain characteristics of the visitor from the request (or from a visitor profile) such as the locale of the visitor, browser version, etc. and then select the appropriate content and presentation. For example, if a visitor from Spain, using a tablet, makes a request for a web page that contains the hockey related content item 530, the website server can resolve the request using metadata from site object 500, channel B object 512, channel Y object 516, etc. Based on the metadata of the English language content item 540 or a containing item, the website server can determine that the content language is multilingual, meaning that there are potentially versions available in other languages, and select the appropriate language (e.g., Spanish item 545) for the user's locale. Furthermore, the website server can format data corresponding to the request in the appropriate format (e.g., according to Tablet presentation information 550).

According to one embodiment, when the website represented in FIG. 5A is published to the production system, all the content for the website will generally be considered available. However, if there is a delay in publishing particular items, this may not actually be the case. For example, while the metadata for site object 500 may indicate that it is available in a mobile version, the mobile presentation information 555 may not have reached the production server. Similarly, while the content item 530 (or content item 540) may indicate that it is a multilingual content item with English, Spanish and German, this may not be the case if one of the language specific content items has not been provided to the production website yet.

Accordingly, features of a website that are not yet complete may be classified as inactive so that the features are not available to users even though content items associated with those features are published to the website. The inactive features may be hidden from end users. When the status of the feature is changed to active, the features become available. According to one embodiment, the active/inactive status of features may be set in metadata that applies to multiple content items, formats or other items of a website so that the status does not have to be changed on an item-by-item basis.

Figure 5B:
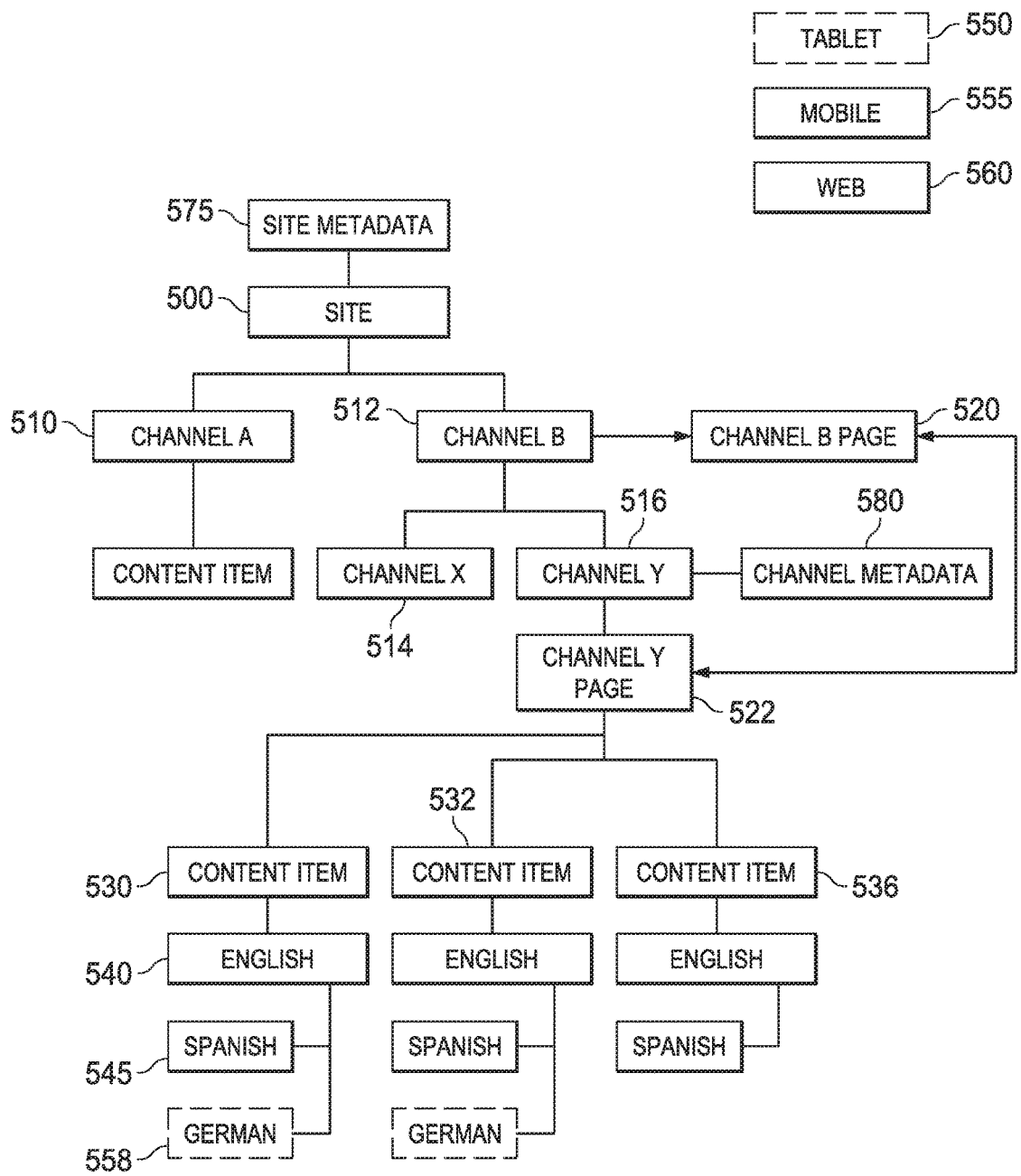
FIG. 5B is a diagrammatic representation of another embodiment of a website hierarchy.

FIG. 5B illustrates the site structure of FIG. 5A with additional metadata. With reference to FIG. 5B, a status can be set in an object in the website hierarchy to specify groups of content items that will be inactive, even though the object and members of the group may be published. According to one embodiment, the status can be set so that content items subordinate to the object and having a specific metadata parameter value or values will be considered inactive. Additionally, formatting can be set to active or inactive to specify whether data associated with the object can be presented according to the formatting.

For example, in FIG. 5B, the website supports the languages English, Spanish, and German and the presentation formats Web, Mobile, Tablet. According to one embodiment active/inactive status can be set for each in site metadata 575 or channel metadata (e.g., channel metadata 580). According to one example, the following can be set in site metadata 575: Web:Active, Tablet:Inactive (indicated by the dashed box for Tablet), Mobile:No status. Furthermore, in this example, the languages are set in channel metadata 580 as English (EN):Active, Spanish (ES):Unspecified (e.g., website developer did not specify whether Spanish translations should be available or not), German (DE): Inactive (indicated by the dashed boxes around German content items). Default behavior can be specified where a request associated with a particular LOCALE/FORMAT combination is received when language has an unspecified status or no status is set for a format.

Table 1, below, provides an example for setting the status of features for pages associated with Channel Y and whether the page will be returned. The first two rows specify how to handle the case where a particular language or format setting is unspecified/missing.

| | | | | | | |
|---|---|---|---|---|---|---|
| Hide if Availability of Language Unspecified | No | Yes | No | Yes | | |
| Hide if format not explicitly associated | No | No | Yes | Yes | Translations | Formats |
| EN/Web | Yes | Yes | Yes | Yes | active | active |
| EN/Mobile | Yes | Yes | No | No | Active | missing |
| EN/Tablet | No | No | No | No | Active | Inactive |
| ES/Web | Yes | No | Yes | No | missing | Active |
| ES/Mobile | Yes | No | No | No | missing | missing |
| ES/Tablet | No | No | No | No | missing | Inactive |
| DE/Web | No | No | No | No | Inactive | Active |
| DE/Mobile | No | No | No | No | Inactive | missing |
| DE/Tablet | No | No | No | No | Inactive | Inactive |

Table 1 indicates whether the website will make specific combinations of formats and languages available for pages associated with Channel Y. For languages and formats that are inactive, the website may hide those features from users. For example, web pages associated with Channel Y may include a menu component to allow a user to select a language. Because German is inactive, the menu component will not include an option for German. If German is made active, however, the menu component may begin to include an option for German. Similarly, if a user makes a request using a tablet, the user may not be given the option to view the page in a tablet format. Instead, the web server may return the page in a Web format with an option to view a Mobile version of the page, return the page in a Mobile version and give the user the option to view the page in a Web version of the page, provide an error or take other action.

Because the availability of the format Mobile is not indicated, whether a page will be returned for a request associated with Format:Mobile will depend on the locale and the behavior specified for unassociated formats. Similarly, since the availability of Spanish is not indicated, whether a page is returned in response to a request associated with Language:Spanish will depend on the Format and the behavior specified for unavailable translations.

In some cases, the website system may be configured to automatically determine a particular combination of features to use for a user. For example, for a user in Germany using a desktop based web browser, the website system may automatically associate requests from the user with language=de and presentation=web. According to one embodiment, if the locale and format correspond to a language and format that are hidden, the web server system can return an error or may return a page in a default language or format. Similarly, if a user makes a request corresponding to a hidden feature, for example the user types in a ?language=de or other parameter when making a request, the requested page will not be returned. Instead, the web server system can return an error or may return a page in a default language or format.

One advantage of embodiments described herein is that aspects of a published site can be rolled out over a period time. Because German is inactive in Channel Y, the site of FIG. 5B can be published without the German content items, but without having to change the metadata of, for example, English content item 540 or the data associated with a translation group (discussed below). The German content items can be provided for Channel Y over time and, when the content items are ready, German made active and thus available to the public on the production system. Similarly, the site can be published with Tablet set to inactive. The site content can be made available in Web and Mobile formats. Once the methods and objects for Tablet presentation are sent to the production site, the status can be changed to active and the Tablet format used.

Setting active/inactive status can be done in a node in the hierarchy to affect the availability of content items subordinate to the node and the presentation of content items subordinate to the node without changing the metadata of the subordinate content items. This provides the advantage that a content item available through multiple channels may be considered active in one channel and inactive in another channel. This also provides the advantage that items like translation groups do not have to be changed to accommodate a delayed member of the group.

To increase the speed of responding to requests, one or more objects or the associated metadata of site hierarchy may be placed in a reference cache (e.g., reference cache 312 of FIG. 3) and fragments of pages generated or retrieved based on processing the objects in a page cache (e.g., page cache 314 of FIG. 3). Thus, resolving the request may include processing objects in a cache. When the status of a feature changes, the object on which the feature was changed may be invalidated in the reference cache. Thus, for example, if the state of German is changed from active to inactive in the site object metadata, the site object may be invalidated in the reference cache. Other objects associated with the inactive feature may also be invalidated in the reference cache.

When the next request is received, the website system can retrieve the updated site object from the primary data store (e.g., data store 310 of FIG. 3), determine whether features corresponding to the request are active or inactive and update the reference cache with the updated site object. Based on whether the features corresponding to the request are active or inactive, the website system can respond to the request appropriately (e.g., if the request requests content associated with the German language feature, the website system can return an error page or other page).

Figure 6:
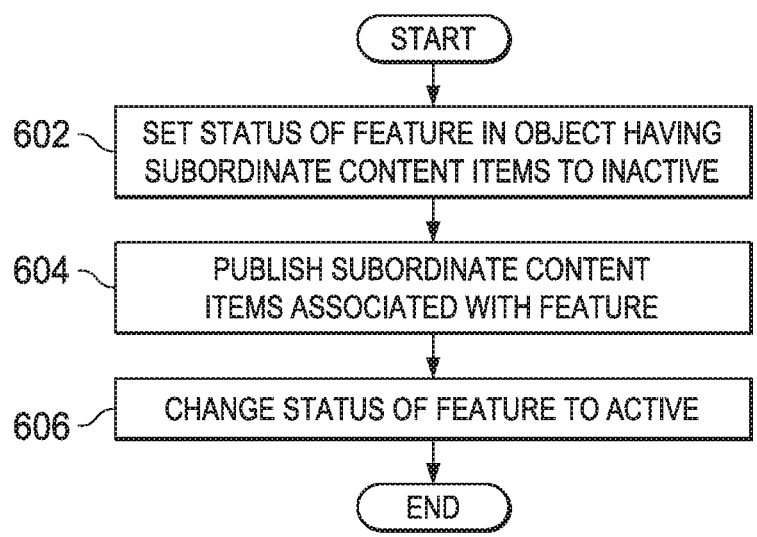
FIG. 6 is a flow chart for one embodiment for controlling deployment of website content.

FIG. 6 is a flow chart illustrating one embodiment of controlling deployment of content in a website. According to one embodiment, an object, such as a site object, channel object or other object having subordinate content items can be selected. The status of a feature can be set in the metadata for the object to inactive (step 602), while other features may be set to active. Thus, for example, the status of particular languages, formatting or other features can be set to active or inactive. The object can be published or the metadata for the object otherwise updated at a target website system. Content items subordinate to the object and associated with the feature can be published to the website system (step 604). Preferably, the content items are published according to a dynamic update model. At step 606, the status of the feature can be changed by, for example, changing the metadata of the object, to make the subordinate content items active and available at the website system. According to one embodiment, the object with updated metadata can be republished. The steps of FIG. 6 can be repeated as needed or desired and performed in different orders. Substitute steps can be implemented and steps added or omitted.

Figure 7:
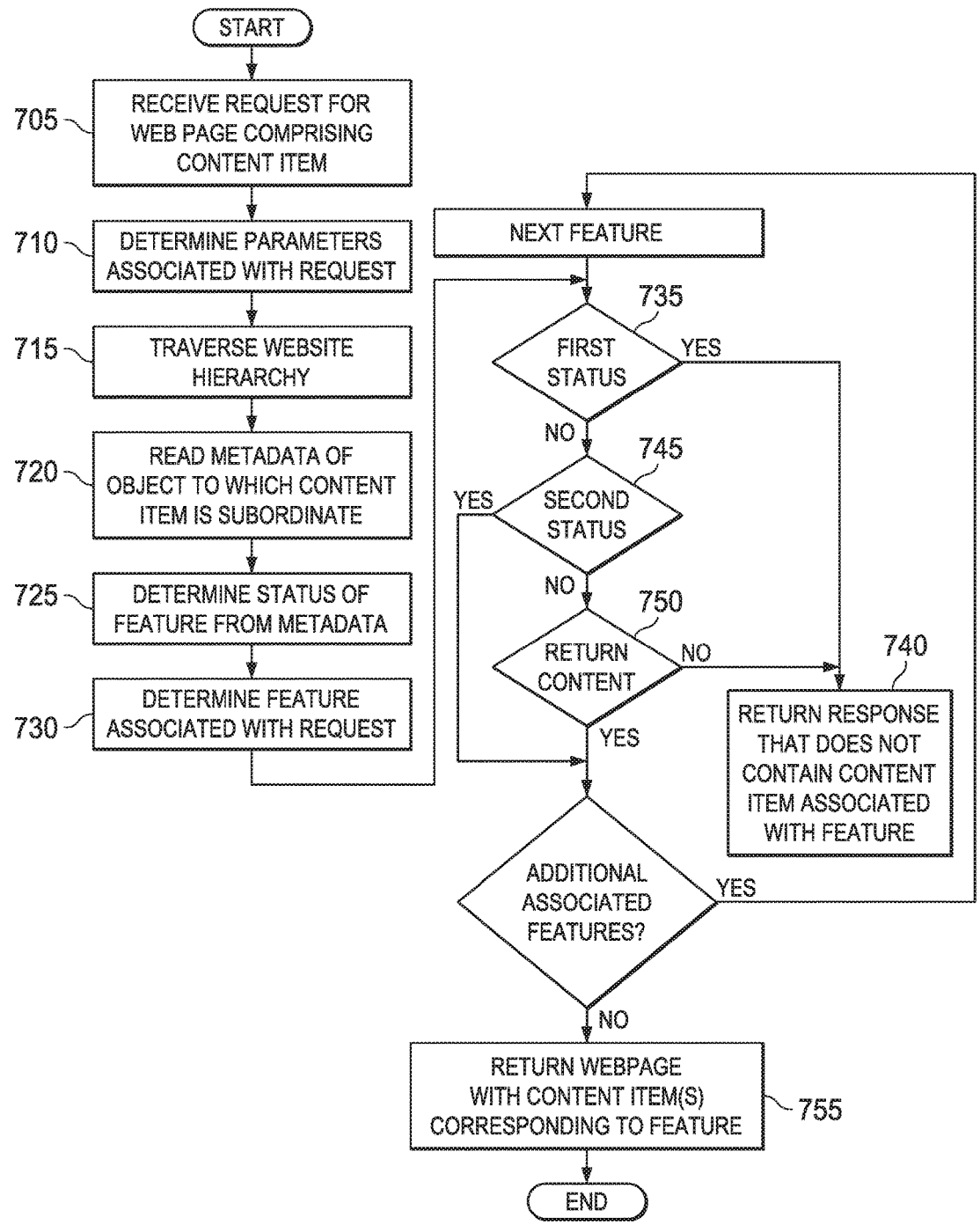
FIG. 7 is a flow chart for one embodiment of processing a request in a website system.

FIG. 7 is a flow chart of one embodiment of processing a request in a website system in which features may be active or inactive. At step 705, a request for a web page or portion of a web page comprising content associated with a feature can be received. Parameters associated the request can be read from the request, user profile information, or other information (step 710).

The website server can traverse the website hierarchy to resolve the request to a particular web page(s) corresponding to the request (step 715). For a webpage request that resolves to a particular content item, the website server can read metadata of objects to which the content item is subordinate (step 720) and determine the status of various features (step 725). In one embodiment, the website server can determine if the feature has a first status or second status, where, for the sake of example, the first status will be "inactive" and the second status is "active."

It can be noted that the same content item may be referenced through multiple paths in a site hierarchy. For example, the same content item may be referenced by a Channel A page and a Channel B page. Depending on the path through the hierarchy used to resolve the request, the status of a feature may be a first status for one path, but a second status for the second path (e.g., inactive the request requests a Channel A page, but active if the request requests a Channel B page).

The website server may determine a feature associated with the request (step 730) based on the parameters associated with the request, content items requested or other information. For example, a parameter associated with a request may be mapped to a language feature, a format feature or other feature.

If a feature associated with a request has a first status (e.g., "inactive") (as determined at step 735), the website server can return a response that does not include content items associated with that feature. For example, the website server can return a web page file for an error page or default content (step 740). In some cases, the returned web page may hide the feature, such as by not including certain links that would be included if the feature was active.

If the feature has a second status (e.g., "active") (as determined at step 745), the website server can continue to evaluate features associated with the request until it determines that any feature associated with the request is "inactive" or all the features are active (or have some other non-inactive status).

If a feature has neither the first status or second status (e.g., has no status, or a third status) the website system can apply additional rules to determine how to respond to the request (as determined at step 750). For example, the web server may be configured to consider the lack of status equivalent to "active" or "inactive".

If all the features associated with the request have an active status (or in some cases have no status or another status), the website server can return the requested page (step 755) including content items associated with the features. This can comprise returning a web page file comprising content associated with the active feature.

To provide an example, a website server can receive a request from a first user for a page containing a hockey story (step 705) and determine that the request is associated with Locale:Canada and Device:phone (step 710). The website server can traverse the objects in the site hierarchy reading the metadata and determine that at the site object Format:Mobile is Inactive, Format:Web is active, English is Active and German is Inactive (steps 715, 720 and 725). Furthermore, the website server can determine that Device:phone is associated with Format:Mobile and Locale:Canada is associated with Lang:English (step 730) and, thus, the request is associated with the features Format:Mobile and Lang:English. Because Format:Mobile is inactive, the website server branches to step 735 and returns an error or other web page such as the web page formatted for a desktop web browser.

As another example, the website server can receive a request from a second user for a page containing a hockey story (step 705) and determine that the parameters for the request include Locale:Canada and Browser:Desktop (step 710). The website server can traverse the objects in the site hierarchy reading the metadata and determine that Format:Mobile is Inactive, Format:Web is active, English is Active and German is Inactive (steps 715, 720 and 725). Furthermore, the website server can determine that Browser:Desktop is associated with Format:Web and Locale:Canada is associated with Lang:English (step 730). Thus, the request is associated with the features Format:Desktop and Lang:English. Because Format:Desktop and Language:English is active, the website server branches to step 745 and returns the web page with the English language content items in the web format.

The steps of FIG. 7 can be repeated as needed or desired and performed in different orders. Substitute steps can be implemented and steps added or omitted.

As discussed above, in some cases, content items may be part of a content group, such as a translation group. In this disclosure, a content group is used to relate content items. Assigning the same content group identifier to multiple content items establishes a content group. Content items in the content group may be added or removed at any time. Applied to multiple instances of the same content type, each member of the content group represents content configured for a specific feature. For example, each member of a translation group represents content configured for a specific locale or language. The content group represents a composite content item (e.g., the translation group represents a composite, multilingual content item). Meanwhile, each of its members remains a content item fully capable of an independent life-cycle. While the example of a translation group is used, other types of content groups can be established.

Figure 8:
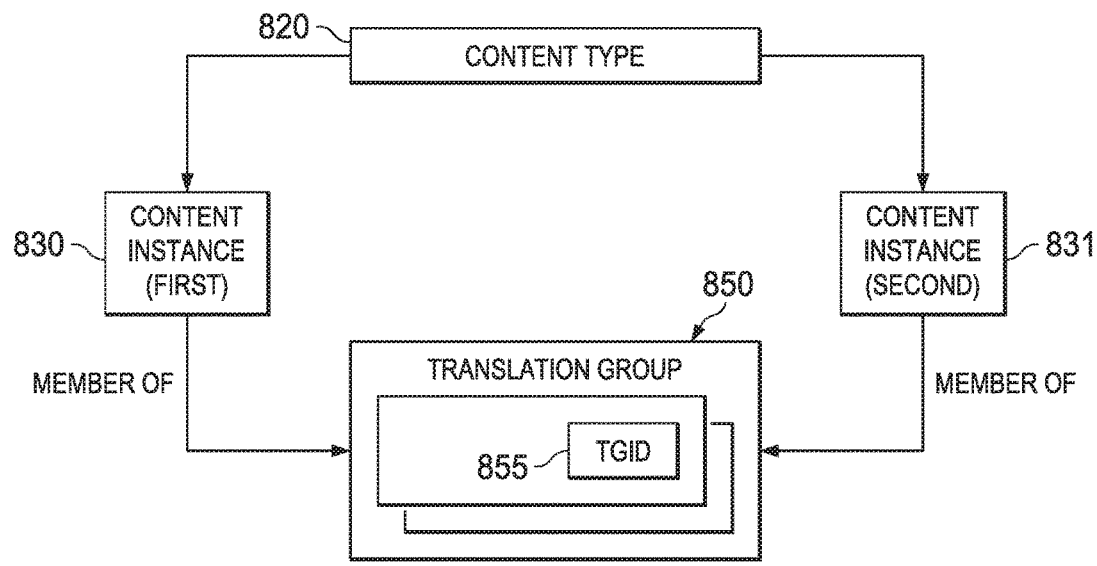
FIG. 8 illustrates one embodiment of a translation group.

FIG. 8 illustrates one embodiment of a translation group 850. A user in the development environment may create an original content instance 830 of content type 820 using a first language (e.g., a default language) and second content instance 831 that is a content instance configured for a particular language or locale (e.g., a translation of the first content instance 830). Various translation methods can be utilized to perform the translation(s). For example, an original content instance 830 can be duplicated to create a new content instance (e.g., translation 831) which can be edited by a user. The creation of the new content instance can be manual or automatic (e.g., through a translation workflow). As another example, a user may select an existing content item to assign it as a translation instance 831 for original content instance 830. Second content instance 831 is not necessarily a translation of first content instance 830, but may be content that is intended for a particular locale or language in lieu of content instance 830.

Original instance 830 and second content instance 831 are members of a translation family or group 850 having a translation group identification (TGID) 855. Members in translation group 850 all have the same TGID 855. The TGID may be included in the metadata of the content instance 830 and content instance 831 to identify them as being members of translation group 850.

Translation group 850 may be referenced through an exemplar reference. Exemplar references allow any member of a translation group to function as an independent content item or as an extensible, multilingual content item whose composition and effective resolution, described below, depend on the context in which the reference occurs. In mathematical terms, translation defines an equivalence relation over content, and a translation group is the equivalence class of the exemplar, which may assume its identity.

Translation groups may be assembled (or dissembled) using new or existing content items as members. Any member of a translation group may function as an exemplar, and this happens implicitly anywhere that member's identity is referenced. This includes any channel association or dependency reference to that content item. Moreover, since any content item may be added to, or removed from, a translation group at any time, essentially this means that all references in the system are potentially exemplar references, capable of referring to that individual content item or its translation group, whose membership may change over time. This provides significant flexibility for both multilingual evolution and site deployment.

Exemplar references allow existing, monolingual content to transform intrinsically into multilingual content based on discretionary, incremental introduction of translation groups. This provides a migration path for applications that must preserve substantial investments in existing sites and pages. Without changing or republishing any channel associations or dependency references, sites with potentially large and complex navigation and interrelationship of content may remain functionally intact and operational, while exemplar references implicitly transform from monolingual into multilingual content by superimposing translation groups and members.

Meanwhile, new translation group members become exemplars upon reference, and groups may be divided or arbitrarily refactored at any time. For instance, if divergent evolution of translation members warrants, groups may be branched for differentiation or specialization of new multilingual content. Based on exemplar references, this may all be accomplished in situ, without modification to channel associations or dependency references.

Exemplar references also allow the same content to be shared by multiple sites with different multilingual composition, including single member (monolingual) composition. In other words, multilingual evolution for the same content can be managed independently for different sites. An "exemplar" can be any object being referenced, whether by channel-association or some arbitrary, user-defined reference. An object may become an "exemplar" when the object being referenced is a member of some translation group—in other words, when it is one of the members of a multilingual content item. For example, although the reference may be to a particular translation (the exemplar), the website system can locate and substitute the appropriate translation based on the request locale. One embodiment the resolution process relies on knowing the translation group to which the exemplar belongs, so it can determine that group's membership in order to select the appropriate translation. The reference attribute alone, in some cases, is not able to indicate the exemplar's translation group; rather, it must resolve that reference to find the exemplar object, then from the exemplar object, find the exemplar object's translation group and that group's members.

Figure 9:
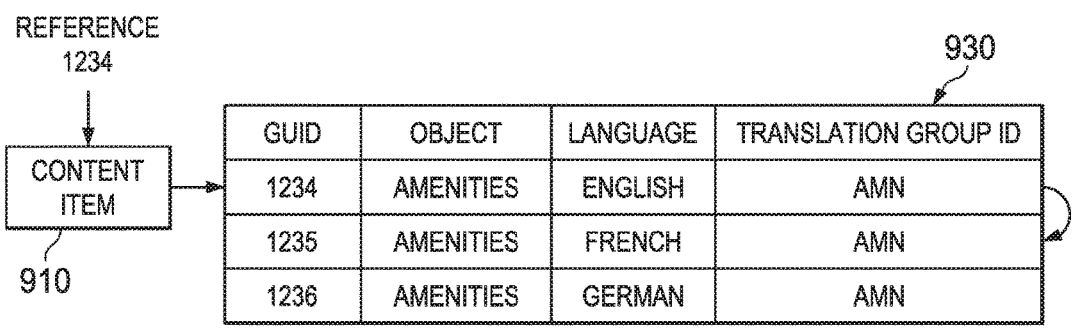
FIG. 9 is a diagrammatic representation of one embodiment of resolving a reference to a translation group.

FIG. 9 is a diagrammatic representation of one embodiment of resolving a reference to a translation group. A request for content may reference a site, which may contain a reference to a channel, which, in turn, may contain one or more references to one or more content items (e.g., content item 910), etc. As described above, each content item can be a content instance or a static file, each of which may contain zero or more references to other content instances and/or static files. To facilitate resolving the request, metadata may be utilized.

Metadata for managed objects such as sites, channels, and/or content items in an enterprise computing environment can be stored in any suitable data structures. In one embodiment, data structure 930 may contain information for all the managed objects in an enterprise computing environment. In one embodiment, data structure 930 may contain information for all the managed objects in a collection of objects for a website. Objects within data structure 930 that are translations of each other may be grouped together by associating the same translation group identification with those objects. In the example of FIG. 9, data structure 930 includes information for managed content objects used to generate the source for an amenities section of a web page (e.g., in content areas 216, 236 and 266 of FIG. 2C).

Each managed object may be associated with a global unique identifier (GUID), a name, a language for a managed object, and a translation group identifier (TGID). When defining a content type, multilingual may be enabled, for instance, by enabling a multilingual attribute of the content type. Managed objects created based on such a content type can also be multilingual enabled.

A determination may be made as to whether a referenced content item 910 is multilingual. Again, referring briefly to FIG. 2C in conjunction with FIG. 9, if the hotel.jsp file used in generating source for home pages 210, 230 and 260 directly or indirectly references content item 910 by referencing GUID 1234, a determination can be made if content item 910 (having GUID 1234) is a multilingual content item. This can be done by a content management system. The content management system may check the multilingual attribute for the managed object. If the multilingual attribute for the managed object is not enabled, the managed object is not multilingual. If the managed object is not multilingual, the content management system may interpret the GUID for the managed object as an absolute reference to a single, monolingual content item. The GUID, in this case, can be utilized by the content management system to retrieve the monolingual content item and return it to the application server for dynamic assembly and/or delivery of the requested content to the client device.

If the reference content item 910 is multilingual, the GUID of the content item may be interpreted as an exemplar reference. In this example, the GUID "1234" can be interpreted as an exemplar reference, which can be utilized to determine a TGID for the translation group to which it belongs. As noted above, when a content instance is created, it can be created as part of a translation group and automatically assigned a TGID. Each member of the translation group may be dynamically added to or removed from the translation group at any time. Furthermore, each member of the translation group can be managed, published, and delivered independent of other members in the translation group. As FIG. 9 illustrates, three translations are assigned to the same translation group "Amn". In this case, the exemplar reference of content item 910 can be utilized to determine that content item 910 belongs to the translation group "Amn". Utilizing the translation group identifier "Amn", it can be determined that three different human languages—English, French, and German—are associated with a managed object named "Amenities". One of the translations may be appropriate for delivery to the client device.

Prior to selecting an appropriate translation, an effective locale/language may be determined. This can be done, for example, by parsing the request for content for locale or language identifier that may be set as properties or preferences for the client device or a browser running on the client device. As another example, if the user has registered with the website, the locale and/or language may be determined based on user preference(s). As yet another example, a default setting may be utilized. In some cases, the appropriate language may be determined based on the effective locale.

Suppose the exemplar reference points to an English translation of "Amenities" in the translation group "Amn". However, suppose the effective language is determined to be French or the effective locale France. Instead of returning the English translation of "Amenities", data structure 930 may be used to find the French language version of the content. If the effective language is determined to be German, but German is inactive, then the default "Amenities" may be returned, an error generated or other action taken.

Otherwise, the selected content item can be retrieved and delivered, along with other appropriate managed objects, to the client device in response to the request for content from the client device.

According to one embodiment, certain multilingual content management features, such as locale-resolution for the content group, cannot be fulfilled if the exemplar reference cannot be resolved. This could happen if an exemplar were unpublished or deleted, leaving a dangling reference from another object. For example, if the content item having GUID 1234 is deleted, the exemplar reference would point to the translation group. However, since other members of that translation group remain, the risk of unpublishing or deleting one of the translations, should it be an exemplar, may be less obvious to the user, especially when there is no indication which translations are functioning as exemplars. Accordingly, some embodiments may optionally be configured to provide some intervention in the form of API exceptions or user interface (UI) warnings/confirmation dialogs to advise the user when they risk dangling an exemplar reference by unpublishing or deleting it. According to other embodiments, the TGID can be used as the exemplar reference. The active/inactive flag for a language can be used to determine whether to return a content item associated with the language in response to a request for the exemplar reference.

Figure 10:
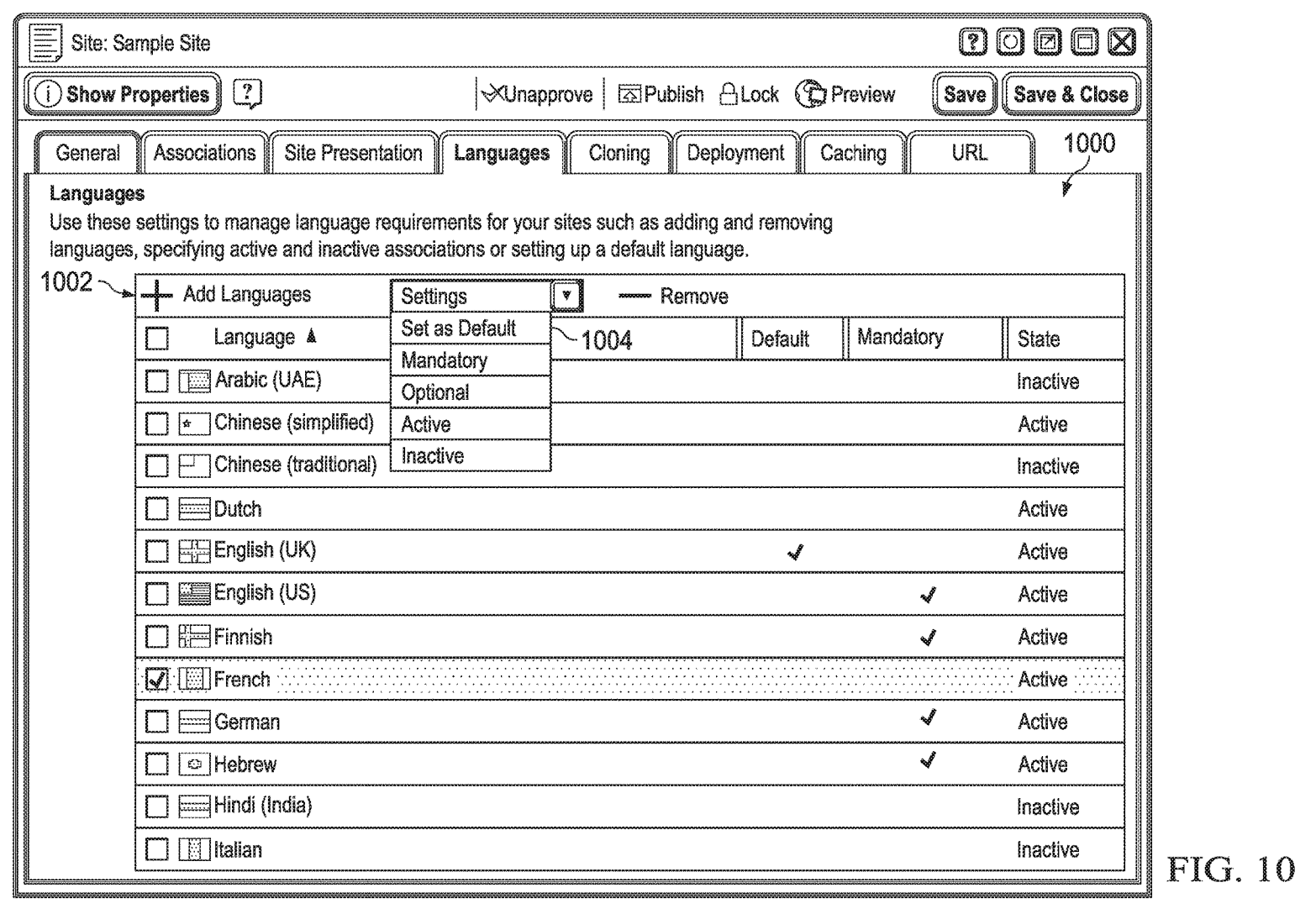

As discussed above, the status of various features of a site can be specified in metadata of site objects or other metadata. FIG. 10 is a diagrammatic representation of one embodiment a portion of a graphical user interface 1000 in which a user can select the status of languages for the site Sample Site in a development environment. According to one embodiment, the user can click on "Add Languages" button 1002 to see a list of available languages and add or subtract languages. The user may also access settings menu 1004 to set a language as a default, to classify a language as mandatory or optional and to set the status of a language as active or inactive.

If no language is selected, the site can be considered "non-lingual" because the website system does not differentiate content items based on language. Declaring languages for a site indicates which languages the site supports. Languages can be added or removed from that list over time to change the site's supported languages. When a translation group member is published to the site, whether directly or indirectly through some exemplar reference, other members of the exemplar's translation group that are among the site's supported languages may be automatically included in the publishing operation. The result is a multilingual content item composed of the site's supported languages. Though, in some cases, the publication of some members may be delayed.

Furthermore, supported language eligibility may be used to segment and target translations for the same multilingual content item to different sites, resulting in different compositions for that content at those sites. Different sites may define overlapping or disjoint sets of supported languages. A single site may support all languages, or parallel sites may each declare a distinct language. Dynamic composition and resolution of exemplar references allows site languages to evolve flexibly and orthogonally from translation group membership.

Any subset of the site's supported languages may optionally be declared as required or mandatory. If a language (or subset of languages) is declared as required, that subset defines the required locale eligibility for the site. Required locale eligibility, according to one embodiment, establishes stricter publishing constraints to ensure all multilingual content items consist of all required translations. In other words, it can impose a necessary and sufficient publishing condition upon translation group membership and prevents publishing an incomplete multilingual content item missing any required language. Conversely, it can prevent unpublishing a proper subset of required members which would leave a published incomplete multilingual content item.

Required locale eligibility may be used for various purposes. For instance, it may impose more rigorously the default language for a site, ensuring that any multilingual content that is published always consists of a translation in that language. It may be used to comply with business or regulatory requirements for specific language translations. In general, it allows delivery applications to assume that the composition of all multilingual content items includes translation group members in the required languages. This allows an exemplar reference locale resolution to be assumed for those languages.

When a site declares certain languages to be required, it means that multilingual content published to that site must contain content items associated with those languages. If it does not—for instance, if one of the required translations either does not exist or is not approved—that multilingual content would be "locale ineligible", and it should not be published. Conversely, if an unpublish operation were to remove some, but not all, translations for some multilingual content, that may also constitute a violation of the site's required locales, if it were to leave a proper subset of them published. According to one embodiment, if a required language is set to inactive, then a multilingual content item can be published that does not include content associated with the inactive language or content items associated with the inactive language may be unpublished. The content management system may include logic to enforce language requirements.

Figure 11:
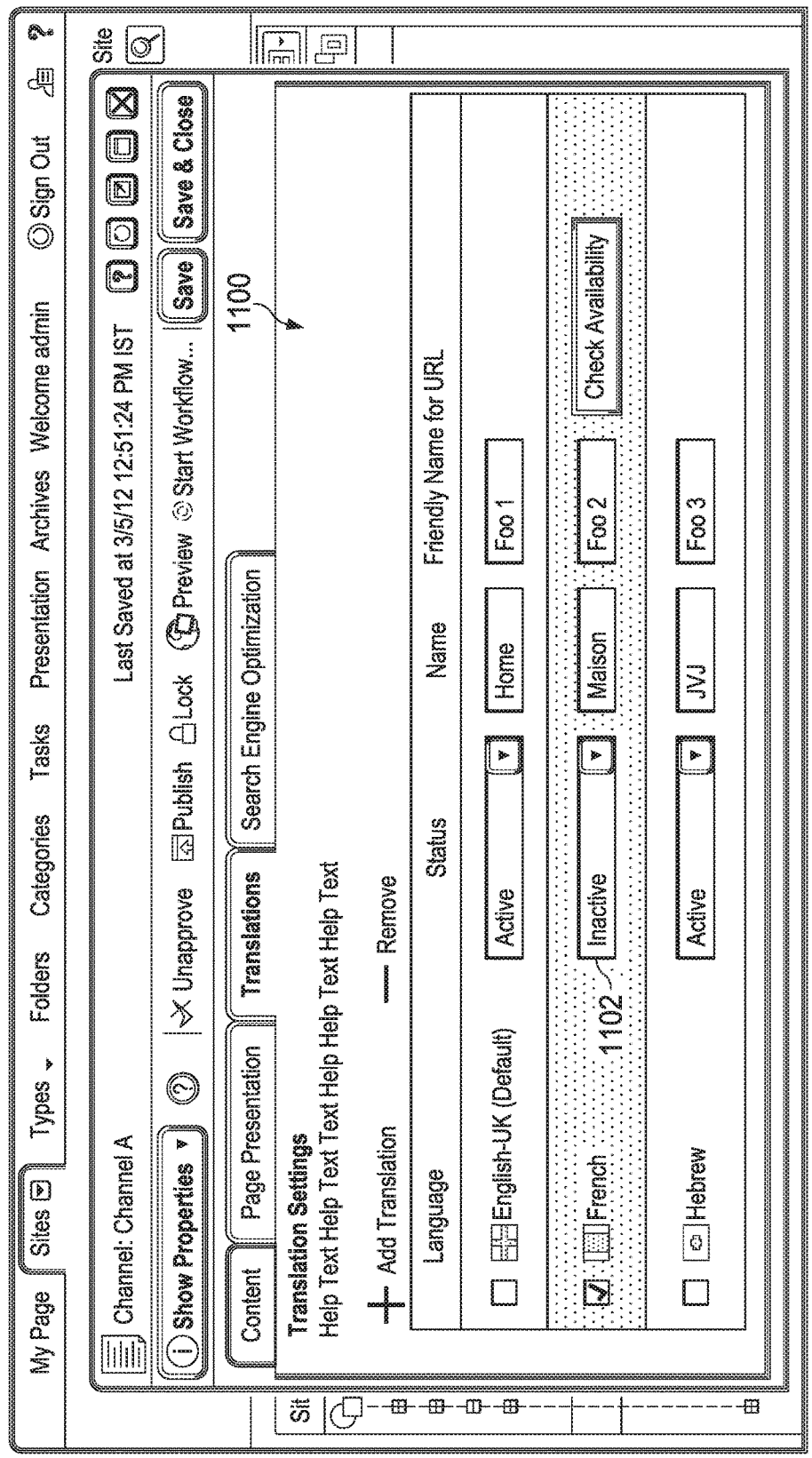
FIG. 11 is a diagrammatic representation of one embodiment of a graphical user interface through which a user may set the status of languages for a channel object.

FIG. 11 is a diagrammatic representation of one embodiment of GUI 1100 through which a user may set the status of languages for a channel object. For example, through status menu 1102, the user may make French active or inactive. Additionally, the user may provide the channel with different names for different languages (e.g., "Home" for English and "Maison" for French and URL for the respective channel pages for each version of the Channel). The user may also specify the name and internal URL for the channel page associated with each language.

Figure 12:
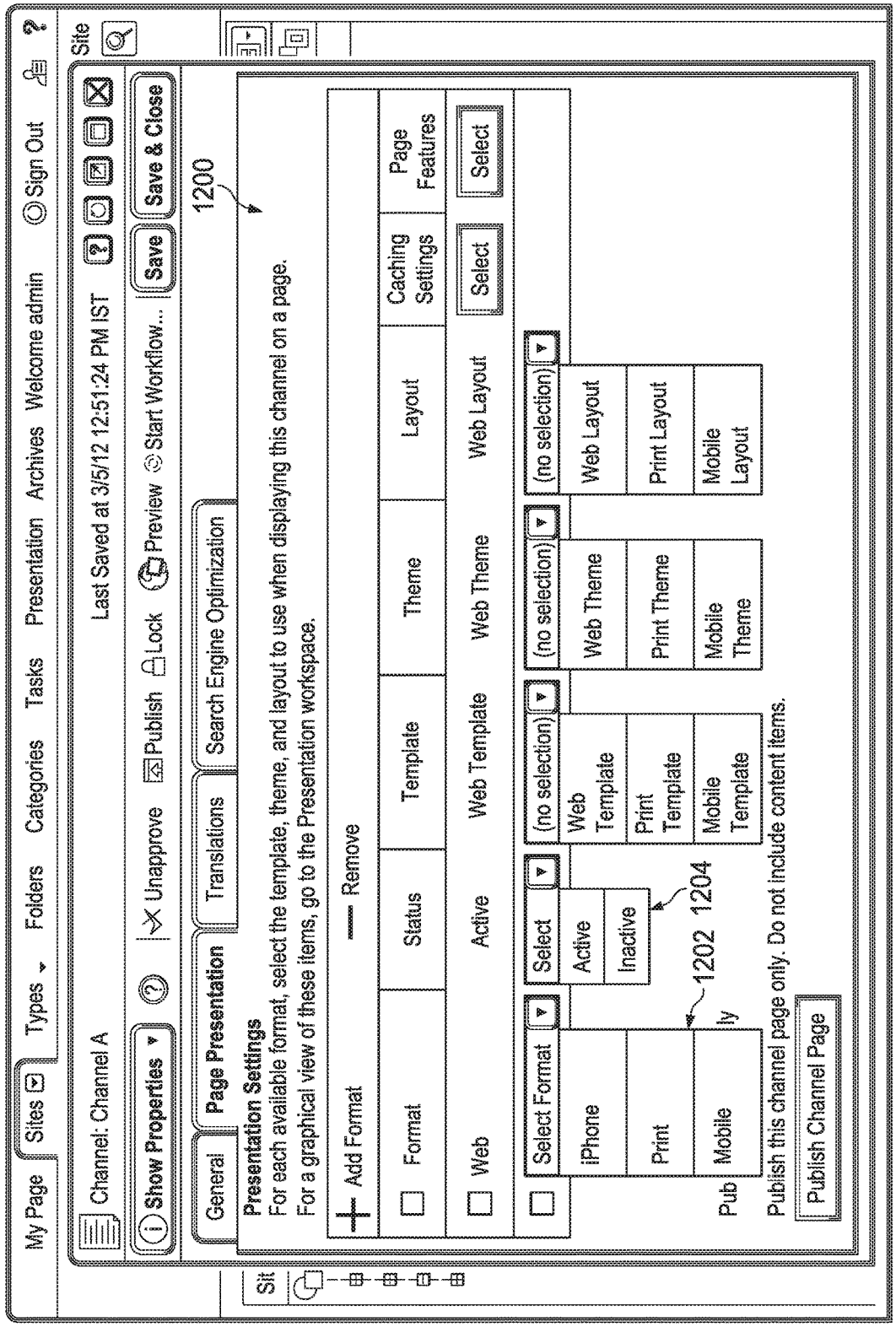
FIG. 12 is diagrammatic representation of one embodiment of a graphical user interface through which a user may associate formats with a channel object.

FIG. 12 is diagrammatic representation of one embodiment of a GUI 1200 through which a user may associate formats with a channel object. A user may select a channel object, in this example, the "Channel A" object, associate formats with the channel object, through format selection menu 1202 and select how the channel page is formatted (e.g., theme, template and layout) for each format. GUI 1200 also allows the user to set the status of the format for the channel object through status menu 1204. For example, the "Web" format may be active for the channel object and the "Print" object may be inactive. Thus, different features may be made active and inactive for different portions of the website.

Figure 13A:
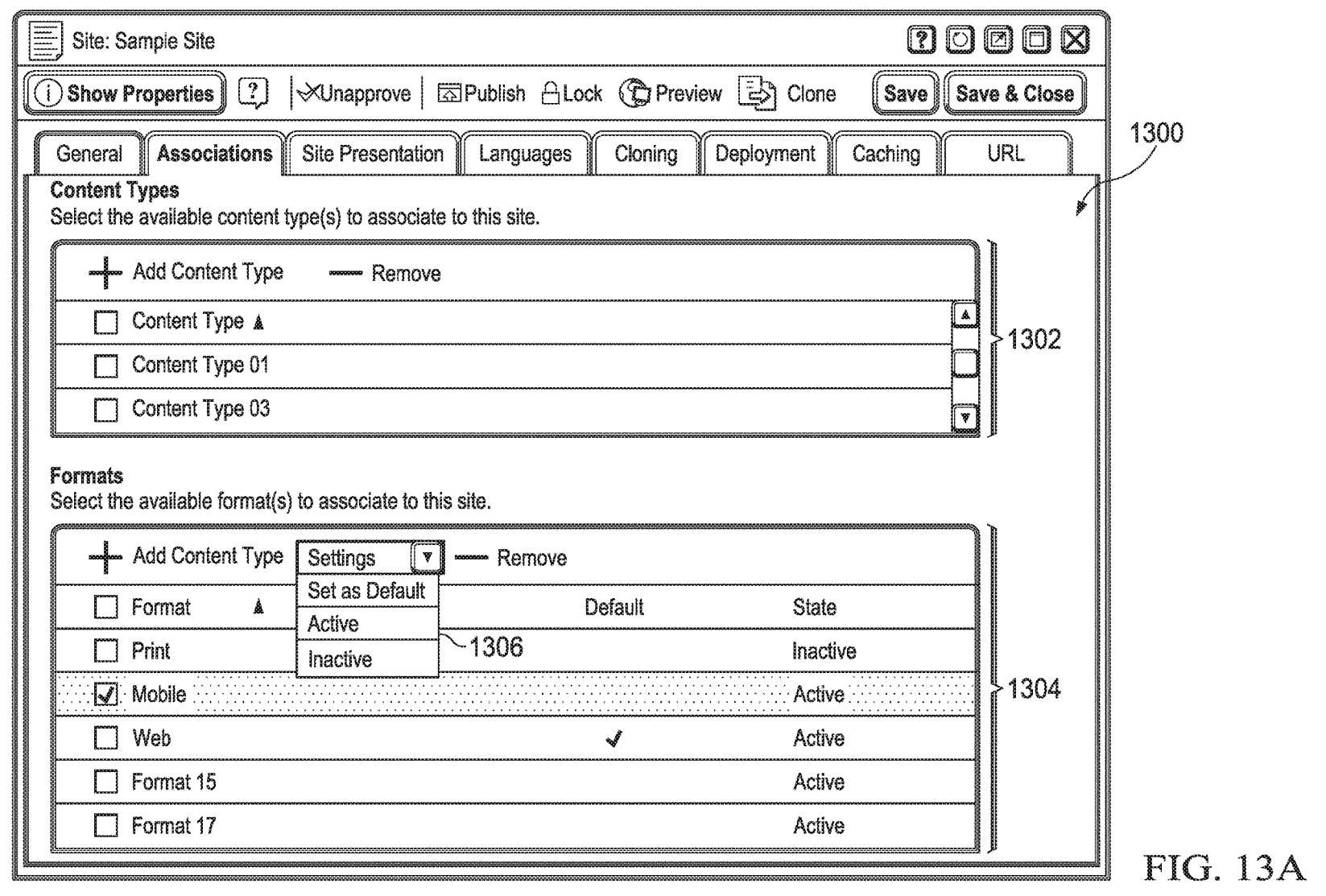

FIG. 13A is a diagrammatic representation of one embodiment of a first portion of a graphical user interface 1300 for setting the status for a format feature for content objects. GUI 1300 may allow a user to specify the content types and formats that will be associated with the site "Sample Site." Content type selection area 1302 allows the user to add content types associated with Sample Site and Format selection area 1304 allows the user to add formats, such as "Print," "Mobile," "Web" and other formats for the site. By selecting a format in settings menu 1306, the user may set a format as active or inactive and may also set a format as default for the site.

Figure 13B:
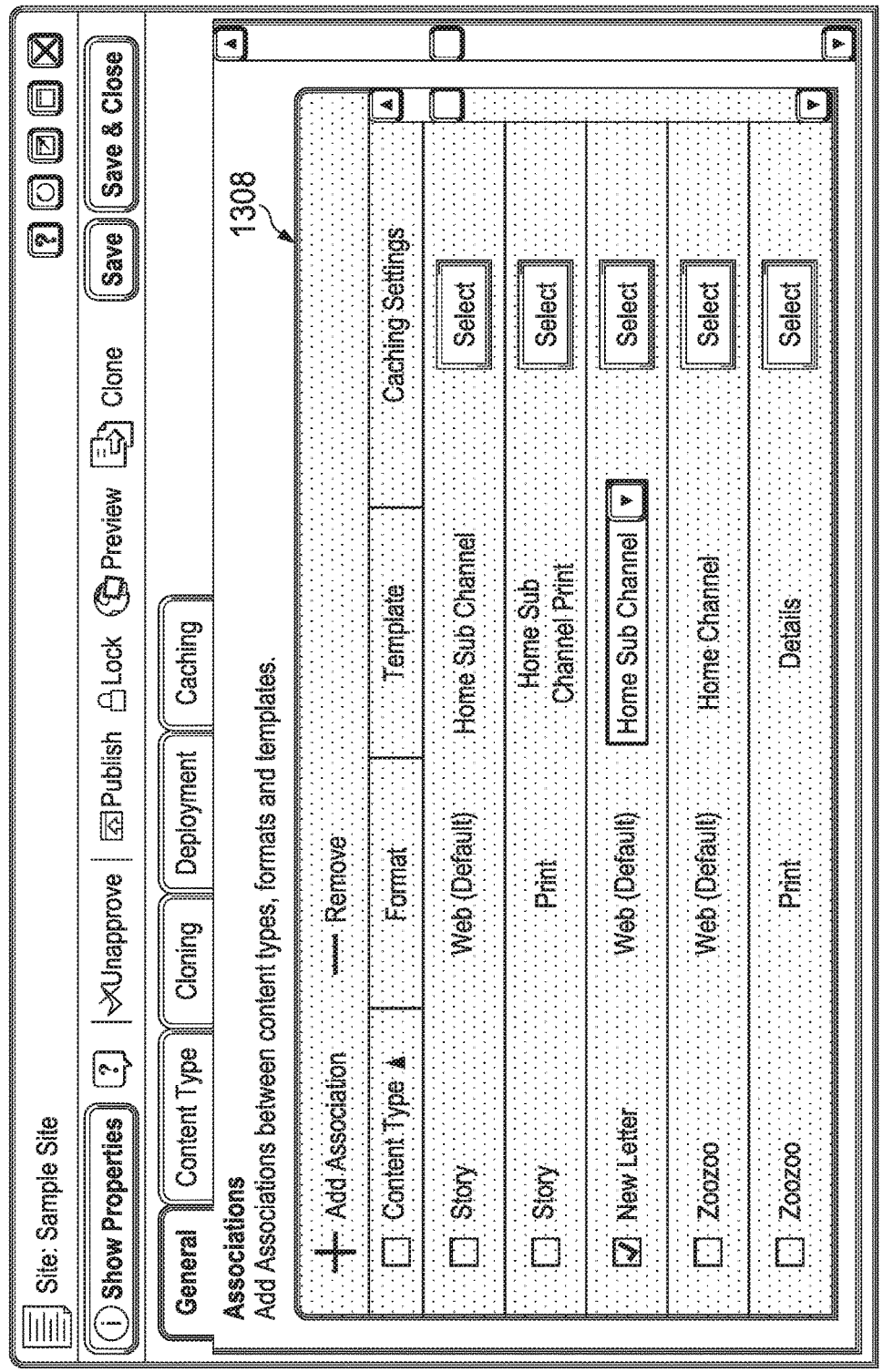
FIG. 13B is a diagrammatic representation of one embodiment of a second portion of graphical user interface in which a user can associate content types with formats.

FIG. 13B is a diagrammatic representation of one embodiment of a second portion of graphical user interface 1300 in which a user can associate content types with formats in associations area 1308. For example, the user can associate the content type "Story" for Sample Site with the formats "Web" and "Print."

The content type and format may be further associated with a template. In the example of FIG. 13B, the Story content type can be associated with the template "Home Sub Channel Print" for the Print format and the template "Home Sub Channel" for the "Web" format. When a request resolves to a Story content item, the page source for that content item will include structure as defined by the Home Sub Channel template (e.g., structural HTML or other structure) if the request is associated with the Web format or structure as defined by the Home Sub Channel Print template if the request is associated with the Print format.

Referring briefly to 13A. If a request is received that requests a web page associated with Channel A that includes a "Print" version of a content item of the "Story" content type, the web server may read the site metadata as defined in FIG. 13A to determine that the "Print" feature is inactive and return an error page (e.g., a 404 error, a customized error page, a default page), even if the content instance for the print version for the story is available to the web server.

While primarily described in terms of languages and formats, content can be associated with other features of a website and those features set to active or inactive. As one example, content items may be tagged or otherwise labeled as belonging to a specific product, campaign, etc. (e.g., using metadata). The product, campaign or other feature can be set to active or inactive as discussed above in conjunction with languages and formats.

For example, content can be tagged as being associated with the "2014 Marketing Campaign." The "2014 Marketing Campaign" can then be set to active or inactive for the site or portion of the site (e.g., a channel). The content associated with the 2014 Marketing Campaign can be hidden while the feature is inactive and, in response to requests for content associated with the 2014 Marketing Campaign, the website server can return other content, such as errors or default content. When the feature is switched to active, the 2014 Marketing Campaign can be made available.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a processor to permit a computer to perform functions, steps, operations, methods, routines, operations or portions thereof described herein. Any suitable language can be used including C, C++, Java, JavaScript, assembly language or other programming or scripting code. Different programming techniques can be employed such as procedural or object oriented. In an embodiment, HTML may utilize JavaScript to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database on the same hardware or over the network.

Steps, operations, methods, routines or portions thereof of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A website system comprising:
   a data store comprising a non-transitory computer readable medium storing a set of objects organized in a hierarchy and content, the set of objects comprising a first object and the content comprising a first content item subordinate to the first object of the hierarchy, and associated with a feature of a website;
   a server coupled to the data store and a network, the server comprising at least one processor executing instructions to;
   receive a request from a client computing device for a web page comprising content associated with the feature;
   determine that the request is associated with the feature of the website;
   determine a status of the feature, the status including one of a first status or a second status;
   in response to determining that the feature has the first status, return to the client computing device a first web page that is a first version of the web page that does not include the content associated with the feature, including the first content item; and
   in response to determining that the feature has the second status, return to the client computing device a second web page that is a second version of the web page that does include the content associated with the feature, including the first content item.

2. The system of claim 1, wherein determining the status of the feature comprises accessing metadata associated with the feature based on a parameter of the request, wherein the metadata indicates the status of the feature.

3. The system of claim 2, wherein the website server resolves the request to a set of website assets associated with the feature, the set of website assets including the first object.

4. The system of claim 3, wherein the metadata is associated with the first object of the hierarchy.

5. The system of claim 4, wherein the metadata is included in definition data associated with the feature stored in a reference cache of the server.

6. The system of claim 5, wherein the definition data stored in the reference cache includes the first object.

7. The system of claim 1, wherein, the instructions are further for, in response to determining that the feature has neither the first status or the second status, applying one or more additional rules to return to the client computing device a third web page that is a third version of the web page.

8. A method comprising:
   providing a data store comprising a non-transitory computer readable medium storing a set of objects organized in a hierarchy and content, the set of objects comprising a first object and the content comprising a first content item subordinate to the first object of the hierarchy, and associated with a feature of a website;
   receiving a request from a client computing device for a web page comprising content associated with the feature;
   determining that the request is associated with the feature of the website;
   determining a status of the feature, the status including one of a first status or a second status;
   in response to determining that the feature has the first status, returning to the client computing device a first web page that is a first version of the web page that does not include the content associated with the feature, including the first content item; and
   in response to determining that the feature has the second status, returning to the client computing device a second web page that is a second version of the web page that does include the content associated with the feature, including the first content item.

9. The method of claim 8, wherein determining the status of the feature comprises accessing metadata associated with the feature based on a parameter of the request, wherein the metadata indicates the status of the feature.

10. The method of claim 9, wherein the website server resolves the request to a set of website assets associated with the feature, the set of website assets including the first object.

11. The method of claim 10, wherein the metadata is associated with the first object of the hierarchy.

12. The method of claim 11, wherein the metadata is included in definition data associated with the feature stored in a reference cache of the server.

13. The method of claim 12, wherein the definition data stored in the reference cache includes the first object.

14. The method of claim 8, further comprising, in response to determining that the feature has neither the first status or the second status, applying one or more additional rules to return to the client computing device a third web page that is a third version of the web page.

15. A non-transitory computer readable medium, comprising instructions for:
   providing a data store storing a set of objects organized in a hierarchy and content, the set of objects comprising a first object and the content comprising a first content item subordinate to the first object of the hierarchy, and associated with a feature of a website;
   receiving a request from a client computing device for a web page comprising content associated with the feature;
   determining that the request is associated with the feature of the website;
   determining a status of the feature, the status including one of a first status or a second status;
   in response to determining that the feature has the first status, returning to the client computing device a first web page that is a first version of the web page that does not include the content associated with the feature, including the first content item; and
   in response to determining that the feature has the second status, returning to the client computing device a second web page that is a second version of the web page that does include the content associated with the feature, including the first content item.

16. The non-transitory computer readable medium of claim 15, wherein determining the status of the feature comprises accessing metadata associated with the feature based on a parameter of the request, wherein the metadata indicates the status of the feature.

17. The non-transitory computer readable medium of claim 16, wherein the website server resolves the request to a set of website assets associated with the feature, the set of website assets including the first object.

18. The non-transitory computer readable medium of claim 17, wherein the metadata is associated with the first object of the hierarchy.

19. The non-transitory computer readable medium of claim 18, wherein the metadata is included in definition data associated with the feature stored in a reference cache of the server.

20. The non-transitory computer readable medium of claim 19, wherein the definition data stored in the reference cache includes the first object.

21. The non-transitory computer readable medium of claim 15, further comprising instructions for, in response to determining that the feature has neither the first status or the second status, applying one or more additional rules to return to the client computing device a third web page that is a third version of the web page.

* * * * *